US012764599B2

(12) United States Patent
Östberg et al.

(10) Patent No.: US 12,764,599 B2
(45) Date of Patent: Oct. 13, 2026

(54) METHODS, APPARATUS AND COMPUTER-READABLE MEDIA RELATING TO LOW-LATENCY SERVICES IN WIRELESS NETWORKS

(71) Applicant: Telefonaktiebolaget LM Ericsson (publ), Stockholm (SE)

(72) Inventors: Christer Östberg, Staffanstorp (SE); Paul Schliwa-Bertling, Ljungsbro (SE); Ingemar Johansson, Luleå (SE); Angelo Centonza, Granada (ES); Henrik Ronkainen, Södra Sandby (SE); Emma Wittenmark, Lund (SE); Per Willars, Vaxholm (SE); Martin Skarve, Enebyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 18/693,473

(22) PCT Filed: Sep. 23, 2022

(86) PCT No.: PCT/SE2022/050843
§ 371 (c)(1),
(2) Date: Mar. 19, 2024

(87) PCT Pub. No.: WO2023/048627
PCT Pub. Date: Mar. 30, 2023

(65) Prior Publication Data
US 2025/0150402 A1 May 8, 2025

(30) Foreign Application Priority Data
Sep. 24, 2021 (EP) .................................... 21382862

(51) Int. Cl.
*H04W 28/02* (2009.01)
*H04L 47/31* (2022.01)
(Continued)

(52) U.S. Cl.
CPC ......... *H04W 28/0289* (2013.01); *H04L 47/31* (2013.01); *H04W 28/0858* (2020.05); *H04W 28/084* (2023.05)

(58) Field of Classification Search
CPC ......... H04L 47/12; H04L 47/31; H04L 47/33; H04W 28/0289; H04W 28/084; H04W 28/0858; H04W 28/0862
See application file for complete search history.

(56) References Cited

U.S. PATENT DOCUMENTS 6,625,118 B1 * 9/2003 Hadi Salim ........... H04L 47/193 370/236
9,419,906 B2 8/2016 Lundin
(Continued)

FOREIGN PATENT DOCUMENTS

| | | | |
|---|---|---|---|
| EP | 4440189 | A1 | 10/2024 |
| WO | 2020159416 | A1 | 8/2020 |

OTHER PUBLICATIONS

3GPP, "3rd Generation Partnership Project; Technical Specification Group Radio Access Network; NG-RAN; Architecture description (Release 16)", 3GPP TS 38.401 V16.6.0, Jul. 2021, 1-79.
(Continued)

*Primary Examiner* — Jason D Recek
(74) *Attorney, Agent, or Firm* — Murphy, Bilak & Homiller, PLLC

(57) ABSTRACT

A method performed by a first network node for uplink congestion control in a radio network is provided. The first network node is operable to handle one or more first layers of a protocol stack for an uplink connection between a
(Continued)

wireless device and the radio network and is communicatively coupled to a second network node handling one or more second, lower layers of the protocol stack. The method comprises obtaining an indication of a proportion of packets within an uplink user plane flow that are to be marked with a congestion indicator, in which the proportion is based on a delay experienced by packets of the uplink user plane flow sent by the wireless device to the second network node. The method further comprises marking the proportion of packets with the congestion indicator and transmitting packets for the uplink user plane flow towards a core network of the radio network.

13 Claims, 19 Drawing Sheets

(51) Int. Cl.
*H04W 28/08* (2023.01)
*H04W 28/084* (2023.01)

(56) References Cited

U.S. PATENT DOCUMENTS

| | | | | |
|---|---|---|---|---|
| 9,585,054 | B2 | 2/2017 | Ahmad et al. | |
| 10,218,620 | B2 | 2/2019 | Mihály et al. | |
| 10,939,357 | B2 | 3/2021 | Malkamaki et al. | |
| 11,956,665 | B2 | 4/2024 | Johansson et al. | |
| 2011/0170408 | A1* | 7/2011 | Furbeck | H04W 28/02 370/230 |
| 2011/0170410 | A1 | 7/2011 | Zhao et al. | |
| 2012/0051216 | A1* | 3/2012 | Zhang | H04L 47/26 370/230 |
| 2013/0229920 | A1 | 9/2013 | Johansson et al. | |
| 2014/0140234 | A1 | 5/2014 | Briscoe | |
| 2015/0085800 | A1 | 3/2015 | Sivanesan et al. | |
| 2016/0094470 | A1 | 3/2016 | Skog | |
| 2017/0187641 | A1 | 6/2017 | Lundqvist et al. | |
| 2018/0048572 | A1 | 2/2018 | Gulati et al. | |
| 2021/0051102 | A1* | 2/2021 | Dong | H04L 47/12 |
| 2021/0352016 | A1* | 11/2021 | Navon | H04L 47/62 |

OTHER PUBLICATIONS

3GPP , "3rd Generation Partnership Project; Technical Specification Group Radio Access Network; NG-RAN; F1 application protocol (F1AP) (Release 16)", 3GPP TS 38.473 V16.6.0, Jul. 2021, 1-463.

3GPP , "3rd Generation Partnership Project; Technical Specification Group Radio Access Network; NG-RAN; NR user plane protocol (Release 16)", 3GPP TS 38.425 V16.3.0, Apr. 2021, 1-25.

3GPP , "3rd Generation Partnership Project; Technical Specification Group Radio Access Network; NR; NR and NG-RAN Overall Description; Stage 2 (Release 16)", 3GPP TS 38.300 V16.6.0, Jun. 2021, 1-152.

3GPP , "3rd Generation Partnership Project; Technical Specification Group Services and System Aspects; Telecommunication management; Performance Management (PM); Performance measurements Evolved Universal Terrestrial Radio Access Network (E-UTRAN) (Release 17)", 3GPP TS 32.425 V17.1.0, Jun. 2021, 1-113.

Briscoe, B. , et al., "Low Latency, Low Loss, Scalable Throughput (L4S) Internet Service: Architecture", draft-ietf-tsvwg-14s-arch-06; Transport Area Working Group Internet-Draft, Mar. 9, 2020, 1-36.

Brunello, Davide , et al., "Low Latency Low Loss Scalable Throughput in 5G Networks", IEEE 93rd Vehicular Technology Conference (VTC2021—Spring), 2021, 1-7.

Ericsson , "Enabling time-critical applications over 5G with rate adaptation", Ericsson—Deutsche Telekom White Paper, May 2021, 1-21.

Le Boudec, Jean-Yves , "Rate adaptation, Congestion Control and Fairness: A Tutorial", Ecole Polytechnique Fédérale de Lausanne (EPFL), Nov. 10, 2020, 1-54.

Unknown, Author , "5G; NG-RAN; Architecture description (3GPP TS 38.401 version 16.6.0 Release 16)", ETSI TS 138 401 V16.6.0, Aug. 2021, 1-81.

Unknown, Author , "5G; NG-RAN; NR user plane protocol (3GPP TS 38.425 version 16.1.0 Release 16)", ETSI TS 138 425 V16.1.0, Jul. 2020, 1-28.

Unknown, Author , "Consideration on the ECN in NR", ZTE Corporation; 3GPP TSG RAN WG2 Meeting #99, R2-1708149, Berlin, Germany, Aug. 21-25, 2017, 1-8.

Unknown, Author , "Flow Control in IAB", Ericsson; 3GPP TSG RAN WG2 Meeting#105, R2-1901387, Athens, Greece, Feb. 25-Mar. 1, 2019, 1-5.

Unknown, Author , "L4S support in 5G", Ericsson, Vodafone, Nokia, Nokia Shanghai Bell, Sprint; 3GPP TSG-RAN WG2 #107bis Tdoc R2-1913888, Revision of R2-1910724, Chongqing, China, Oct. 14-18, 2019, 1-11.

Unknown, Author , "Signaling support for UL packet delay distribution measurement in SA5", Intel Corporation; 3GPP TSG-RAN WG3 Meeting #112-e, R3-212287, Electronic Meeting, May 17-28, 2021, 1-5.

* cited by examiner

METHODS, APPARATUS AND COMPUTER-READABLE MEDIA RELATING TO LOW-LATENCY SERVICES IN WIRELESS NETWORKS

TECHNICAL FIELD

Embodiments of the disclosure relate to wireless networks, and in particular to methods, apparatus and computer-readable media relating to congestion in wireless networks.

BACKGROUND

Typical wireless networks of today, supporting 4G and earlier releases are mainly optimized for mobile broadband (MBB) and voice services. MBB traffic can be very throughput demanding but is in general not latency sensitive. For example, non-realtime streaming services handle long latency by using large buffers which efficiently hide the latency jitter through the network, still resulting in a good end-user experience. In later releases of 4G, but especially in 5G, other types of services have come into focus. Examples of these new services are ultra-reliable low latency communication (URLLC) services (typically targeting industrial applications) and gaming services. Within 3GPP standardization, features are being developed to support these new URLLC services and use cases.

Tele-operated driving is one latency-sensitive use case, but gaming is probably a more common application example, including multi-user gaming, augmented reality (AR), virtual reality (VR), gaming with and without rendering, etc. To satisfy the end-user quality experience for these applications, the end-to-end (E2E) latency must be considered, i.e., in addition to providing low latency through the radio access network (RAN), latency through the core network (CN) and all the way to the application server and/or client needs to be considered. With an edge cloud deployment of the application, the impact of latency from the CN and between the network and the application, can be reduced.

Another quality-of-service (QOS) aspect to consider for latency-sensitive services is reliability, measured as the probability of delivering the traffic within a specified time duration, i.e., fulfilling the latency requirement. The reliability is tightly coupled to the latency requirements, since without the latency requirement, the traffic can always be delivered by using sufficiently many retransmissions. Reliability is thus a very important criteria when tuning networks for latency-sensitive traffic.

Other parameters to be considered when certain QoS levels are to be ensured for a given service is the availability of resources. Ensuring that resources are available at the time when the service needs them ensures prompt data exchange and reduces the number of failures for a given bearer communication process.

E2E Congestion Control and Active Queue Management

E2E congestion control allows for the nodes involved in a traffic path to signal congestion to the source. The signaling may be explicit or implicit, e.g., by dropping packets. The congestion signaling is detected by the source, which then adapts its rate to the weakest link. Active Queue Management (AQM) is often used in combination with E2E rate adaptation to reduce latency jitter for long-lived transfers caused by bursty sources. One example of E2E congestion control and AQM is low latency, low loss, scalable throughput (L4S), described in the section below. L4S uses explicit congestion notification signaling together with an active queue management algorithm and is used throughout this disclosure to exemplify the solution. Those skilled in the art will appreciate that the concepts described herein are equally applicable to other congestion notification mechanisms.

Low Latency, Low Loss, Scalable throughput (L4S)

One way to manage latency, specifically queue delays, in E2E data flows is to make use of LAS (see, Internet draft: Low Latency, Low Loss, Scalable Throughput (L4S) Internet Service: Architecture, tools.ietf.org/id/draft-ietf-tsvwg-14s-arch-06.html). Any node serving an L4S capable data flow may set Explicit Congestion Notification (ECN) bits in the IP header for the flow if congestion is experienced. The receiving client collects the congestion/ECN statistics and feeds this back to the corresponding server. Based on the reported congestion information, the server application adapts its data rate to maintain low queue delays and short E2E latency. Thus, congestion indications are set in the forward direction, collected by the client and sent in a feedback protocol to the server.

Packets are marked "congested" when queue delays are very low which gives a prompt reaction to small signs of congestion, allowing the end hosts to implement scalable congestion control where the transmission rate (or congestion window) is changed proportional to the fraction of congestion-marked packets. See also FIG. 1, illustrating the overall principle.

L4S enables real-time critical data applications to adapt their rate to the weakest link, providing minimal latency impact due to queue build up. The state-of-the-art L4S is typically triggered by thresholds in the transport node input queue and may be used to signal a congested situation. Given that most transport nodes have a fairly stable or slowly varying output rate it gives good results. For radio networks, however, the output rate variations over the wireless link may be more frequent than in traditional wired solutions, which may lead to sudden latency peaks even when L4S is used.

Higher Layer Split in the RAN

In the 5G standard, the gNB can be divided into one Central Unit (CU) and one or more Distributed Units (DU), communicatively coupled to each by the F1 interface as illustrated in FIG. 2 (from 3GPP TS 38.401 v16.6.0).

The F1 interface implies that the PDCP functionality is located in the CU, while the RLC and lower-layer functionality (e.g., MAC and PHY layers) are located in the DU.

FIG. 3 shows the user plane protocol stack between the RAN and UE. In the gNB CU-DU split architecture, the responsibility for RAN-UE protocol stack is divided between the CU and the DU, where the higher layers (SDAP and PDCP) are terminated in the CU and the remaining lower layers (RLC, MAC, PHY) are terminated in the DU. This is illustrated in FIG. 4. The UE is unaware of the internal gNB CU-DU split, which implies identical RAN-UE procedures regardless of gNB internal architecture.

The distributed termination of the RAN-UE protocol layers is enabled by the F1 interface which, for the user plane, provides methods to convey NR PDCP PDUs between CU and DU. Depending on the distance between the CU and DU placement, a transport latency may be added to the gNB processing delay.

User Plane protocol used over F1-U, Xn-U, X2-U

In 3GPP TS38.425 v16.3.0, the UP protocol used for the F1-U, Xn-U and X2-U interfaces is described. In this specification the following two types of PDUs are shown: Downlink Data Delivery Status (DDDS) (PDU Type 1) and Assistance Information (PDU Type 2).

PDU Type 1 has been defined to enable a node hosting lower layers, such as RLC, to convey information about DL traffic flow to the node hosting PDCP. Additionally, this PDU type can be used to signal radio link outage or radio link resume for the concerned data radio bearer to the node hosting PDCP.

PDU Type 2 has been introduced to allow a node hosting lower layers, such as RLC, to convey information that could help the node hosting PDCP to better manage a radio bearer's configuration. As an example, the assistance information may be of different types, as stated below with the Value Range of the Assistance Information Type field. As can be seen, the assistance information provides information concerning the radio channels used for a DRB.

The value range for Assistance Information Type is as follows: {0=UNKNOWN, 1=Average CQI, 2=Average HARQ Failure, 3=Average HARQ Retransmissions, 4=DL Radio Quality Index, 5=UL Radio Quality Index, 6-Power Headroom Report, 7-228=reserved for future value extensions, 229-255=reserved for test purposes}.

The remaining part of this section is a copy from 3GPP TS38.425 v16.3.0.

++++++++Start of text from 3GPP TS38.425 v16.3.0+++++++++

5.5.2.2 DL Data Delivery Status (PDU Type 1)

This frame format is defined to transfer feedback to allow the receiving node (i.e. the node that hosts the NR PDCP entity) to control the downlink user data flow via the sending node (i.e. the corresponding node).

The following shows the respective DL DATA DELIVERY STATUS frame. Table 1 shows an example of how a frame is structured when all optional IEs (i.e. those whose presence is indicated by an associated flag) are present.

Absence of such an IE changes the position of all subsequent IEs on octet level.

TABLE 1

DL DATA DELIVERY STATUS (PDU Type 1) Format

| Bits | | | | | | | | Number |
|---|---|---|---|---|---|---|---|---|
| 7 | 6 | 5 | 4 | 3 | 2 | 1 | 0 | of Octets |
| PDU Type (=1) | | | | Highest Transmitted NR PDCP SN Ind | Highest Delivered NR PDCP SN Ind | Final Frame Ind. | Lost Packet Report | 1 |
| Spare | | | Delivered NR PDCP SN Range Ind | Data rate Ind. | Retransmitted NR PDCP SN Ind | Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range<br>End of lost NR-U Sequence Number range | | | | | | | | 0 or (6* Number of reported lost NR-U SN ranges) |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Successfully delivered retransmitted NR PDCP Sequence Number | | | | | | | | 0 or 3 |
| Retransmitted NR PDCP Sequence Number | | | | | | | | 0 or 3 |
| Number of successfully delivered out of sequence PDCP Sequence Number range | | | | | | | | 0 or 1 |
| Start of successfully delivered out of sequence PDCP Sequence Number range<br>End of successfully delivered out of sequence PDCP Sequence Number range | | | | | | | | 0 or (6* Number of successfully delivered out of sequence PDCP Sequence Number range) |
| Padding | | | | | | | | 0-3 |

5.5.2.3 Assistance Information Data (PDU Type 2)

This frame format is defined to allow the node hosting the NR PDCP entity to receive assistance information.

The following table shows the respective ASSISTANCE INFORMATION DATA frame.

| Bits | | | | | | | | Number |
|---|---|---|---|---|---|---|---|---|
| 7 | 6 | 5 | 4 | 3 | 2 | 1 | 0 | of Octets |
| PDU Type (=2) | | | | PDCP Dupl. Ind. | Assistance Info. Ind. | UL Delay Ind. | DL Delay Ind. | 1 |
| Spare | | | | | | | PDCP Duplication Activation Suggestion | 1 |

-continued

| Bits | | | | | | | | Number |
|---|---|---|---|---|---|---|---|---|
| 7 | 6 | 5 | 4 | 3 | 2 | 1 | 0 | of Octets |
| Number of Assistance Information Fields | | | | | | | | 0 or 1 |
| Assistance Information Type<br>Number of octets for Radio Quality<br>Assistance Information Fields<br>Radio Quality Assistance Information | | | | | | | | 0 or (2*Number of Assistance Info Fields + sum of Number of octets for Radio Quality Assistance Information Fields) |
| UL Delay DU Result | | | | | | | | 0 or 4 |
| DL Delay DU Result | | | | | | | | 0 or 4 |

+++++++End of Text from 3GPP TS38.425 v16.3.0++++++++++

There currently exist certain challenge(s). The need for an efficient rate adaptation for high-rate time critical services is judged to be essential to get a good Quality of Experience when used in Radio Access Networks such as NR. Existing and earlier RAN technologies do not include this possibility.

A major part of the gNB processing delay comes from the radio interface and related scheduling. However, in a gNB split architecture, there is a need to distribute functionality and responsibility between the nodes and define necessary interface modifications. Also, the additional CU-DU transport latency may have to be considered, depending on the distance between the CU and DU placement. An integrated gNB L4S solution (with collocated CU-DU functionality or collocated hosting PDCP and corresponding node) enables a low-complexity design owing to the possibility of sharing data between congestion detection and congestion marking functionality. The problem is that there is currently no defined solution/design addressing the uplink L4S using higher-layer split architecture.

L4S is based on the addition of information at IP level, and it has proven to be an efficient method to provide network-supported rate adaptation (see the white paper by Ericsson, "Enabling time-critical applications over 5G with rate adaptation", May 2021). In the UL direction, IP packets are generated at the UE and in theory the UE could be the node in charge of setting L4S information in the IP packets sent in UL. However, such an approach would have an impact on the availability of the L4S solution, e.g., depending on UE capabilities to support L4S. A better and more operator-controllable approach would be to enable L4S information to be set by the network, so that L4S support would be agnostic to the UE type and capabilities.

SUMMARY

One problem addressed by embodiments of the disclosure is therefore how to support L4S for UL traffic in the network. Such a problem is even more pronounced in split RAN architectures where the gNB-DU has visibility over resource conditions (and therefore congestion) over the radio interface and where UL IP packets are only visible at the gNB-CU-UP.

Certain aspects of the disclosure and their embodiments may provide solutions to these or other challenges. One goal of the embodiments disclosed herein is to enable support for rate adaptive applications in a gNB (CU/DU) split architecture. Several ways for how to distribute the functionality required for uplink congestion control in a gNB (CU/DU) split architecture together with necessary interface updates are proposed. The congestion detection algorithm and the marking probability function may be deployed together either in DU or in CU. There is also an option with DU-deployed congestion detection together a CU-deployed marking probability function. Note that embodiments of the disclosure also apply to scenarios other than split base-station architecture, such as dual- or multi-connectivity configurations (e.g., where a bearer is split between master and secondary nodes).

Embodiments of the disclosure make it possible for UEs and/or specific subscriptions that use specific services to perform an indication from the RAN to limit the impact of a latency due to queue build-up. The specific services may be characterized by: demands on low latency and a capability to perform service rate adaption based on notification from the RAN.

A first aspect of the disclosure provides a method performed by a first network node for uplink congestion control in a radio network. The first network node handles one or more first layers of a protocol stack for an uplink connection between a wireless device and the radio network, and is communicatively coupled to a second network node handling one or more second layers of the protocol stack for the uplink connection. The one or more second layers are lower than the one or more first layers. The method comprises: obtaining an indication of a proportion of packets within an uplink user plane flow over the uplink connection that are to be marked with a congestion indicator, wherein the proportion is based on a delay experienced by packets of the uplink user plane flow sent by the wireless device to the second network node; marking the proportion of packets with the congestion indicator; and transmitting packets for the uplink user plane flow towards a core network of the radio network.

Apparatus is also provided for performing the method set out above. For example, another aspect provides a first network node for uplink congestion control in a radio network. The first network node handles one or more first layers of a protocol stack for an uplink connection between a wireless device and the radio network, and is being communicatively coupled to a second network node handling one or more second layers of the protocol stack for the uplink connection. The one or more second layers are lower than the one or more first layers. The first network node comprises processing circuitry configured to cause the first network node to: obtain an indication of a proportion of packets within an uplink user plane flow over the uplink connection that are to be marked with a congestion indicator, wherein the proportion is based on a delay experienced by packets of the uplink user plane flow sent by the wireless device to the second network node; mark the proportion of packets with the congestion indicator; and transmit packets for the uplink user plane flow towards a core network of the radio network.

In a second aspect, the disclosure provides a method performed by a second network node for uplink congestion control in a radio network. The second network node handles one or more second layers of a protocol stack for an uplink connection between a wireless device and the radio network, and is communicatively coupled to a first network node handling one or more first layers of the protocol stack for the uplink connection. The one or more second layers are lower than the one or more first layers. The method comprises: sending, to the first network node, packets for an uplink user plane flow over the uplink connection, for onward transmission towards a core network node the radio network; and sending, to the first network node, one or more of: an indication of a proportion of packets within the uplink user plane flow over the uplink connection that are to be marked with a congestion indicator, wherein the proportion is based on a delay experienced by packets of the uplink user plane flow sent by the wireless device to the second network node; and an indication of the delay experienced by packets of the uplink user plane flow sent by the wireless device to the second network node.

Apparatus is also provided for performing the method set out above. For example, another aspect provides a second network node for uplink congestion control in a radio network. The second network node handles one or more second layers of a protocol stack for an uplink connection between a wireless device and the radio network, and is communicatively coupled to a first network node handling one or more first layers of the protocol stack for the uplink connection. The one or more second layers are lower than the one or more first layers. The second network node comprises processing circuitry configured to cause the second network node to: send, to the first network node, packets for an uplink user plane flow over the uplink connection, for onward transmission towards a core network node the radio network; and send, to the first network node, one or more of: an indication of a proportion of packets within the uplink user plane flow over the uplink connection that are to be marked with a congestion indicator, wherein the proportion is based on a delay experienced by packets of the uplink user plane flow sent by the wireless device to the second network node; and an indication of the delay experienced by packets of the uplink user plane flow sent by the wireless device to the second network node.

Certain embodiments may provide one or more of the following technical advantage(s). One advantage of the embodiments disclosed herein is to secure an efficient way to deploy the uplink congestion detection for network-supported rate adaption such as L4S in the defined higher layer split architecture in NR. This will enable a good QoE for high-rate, rate adaptive services demanding short latency.

BRIEF DESCRIPTION OF THE DRAWINGS

For a better understanding of the embodiments of the present disclosure, and to show how it may be put into effect, reference will now be made, by way of example only, to the accompanying drawings, in which.

DETAILED DESCRIPTION

Some of the embodiments contemplated herein will now be described more fully with reference to the accompanying drawings. Embodiments are provided by way of example to convey the scope of the subject matter to those skilled in the art. Although described in the context of a distributed base station, e.g., where the base station is split into a centralized unit (CU), which may itself be split into control plane (CP) and user plane (UP) units, and one or more distributed units (DUs), this disclosure presents methods and apparatus that can be applied in any use case where the user plane protocol described in TS38.425 v16.3.0 is used. Namely, the use cases covered are those where a node hosting lower layers and a node hosting the PDCP protocol communicate with each other by means of the Xn-U, X2-U and F1-U interface, or via any other interface following TS38.425 v16.3.0.

Such a situation may occur where a wireless device is configured with dual connectivity or multi-connectivity, for example. In these cases, the wireless device is configured with connections to multiple base stations: a master node (e.g., MeNB, MgNB, etc) and one or more secondary nodes (e.g., SeNB, SgNB, etc). Radio bearers may be split between the master and secondary nodes, such that lower layers of the protocol stack (e.g., RLC, MAC and/or PHY) for the connections/bearers are hosted at the secondary node, and higher layers (e.g., PDCP, IP, etc) are hosted at the master node. Embodiments of the disclosure are therefore equally applicable to these scenarios. Throughout this disclosure, except where otherwise indicated, the term "first network node" refers to a network node or base station hosting upper layers of a protocol stack for a connection between a wireless device (e.g., UE) and a radio network. Examples of first network nodes include centralized units (e.g., CU-UP) of distributed base stations, and master nodes for a wireless device configured with dual- or multi-connectivity. The term "second network node" refers to a network node or base station hosting lower layers of a protocol stack for a connection between a wireless device (e.g., UE) and a radio network. Examples of second network nodes include distributed units (DUs) of distributed base stations, and secondary nodes for a wireless device configured with dual- or multi-connectivity.

Figure 1:
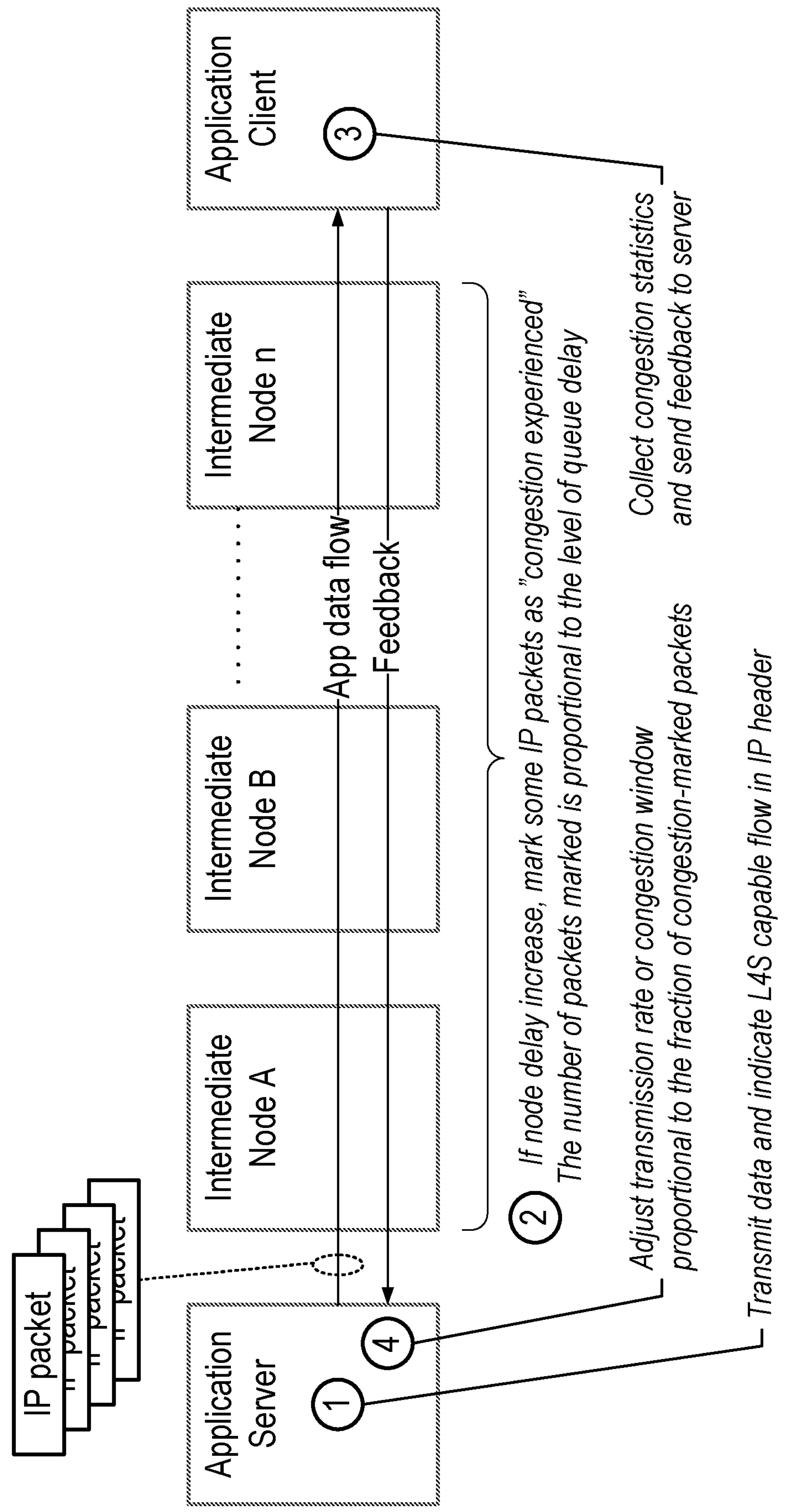
FIG. 1 shows an overview of the functionality of Low Latency, Low Loss, Scalable Throughput (L4S)
Figure 2:
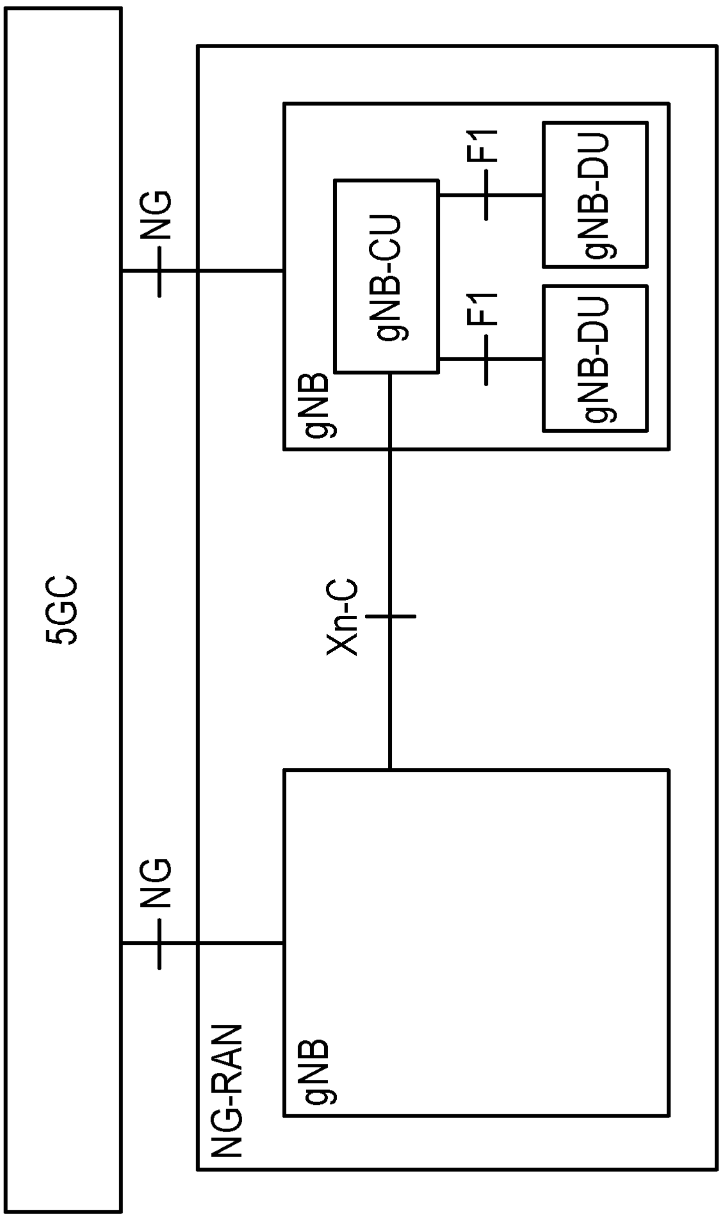
FIG. 2 shows a higher-level split in a Next Generation Radio Access Network (NG-RAN)
Figure 3:
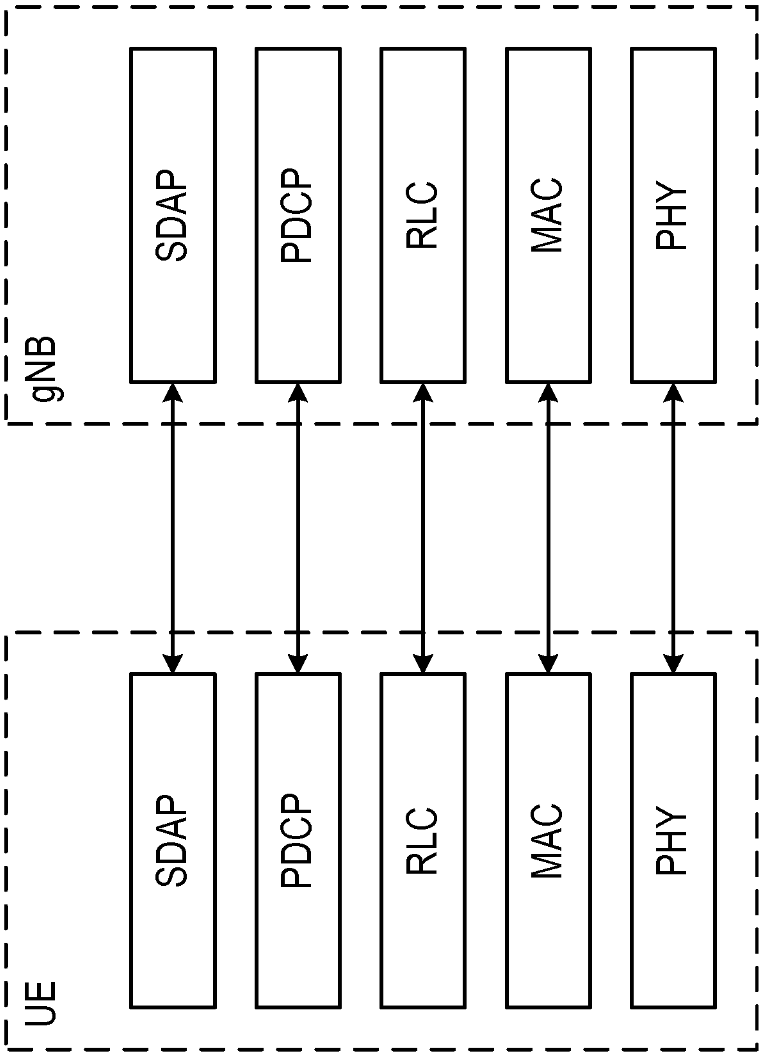
FIG. 3 shows a user plane protocol stack for a user equipment (UE) and gNodeB (gNB)
Figure 4:
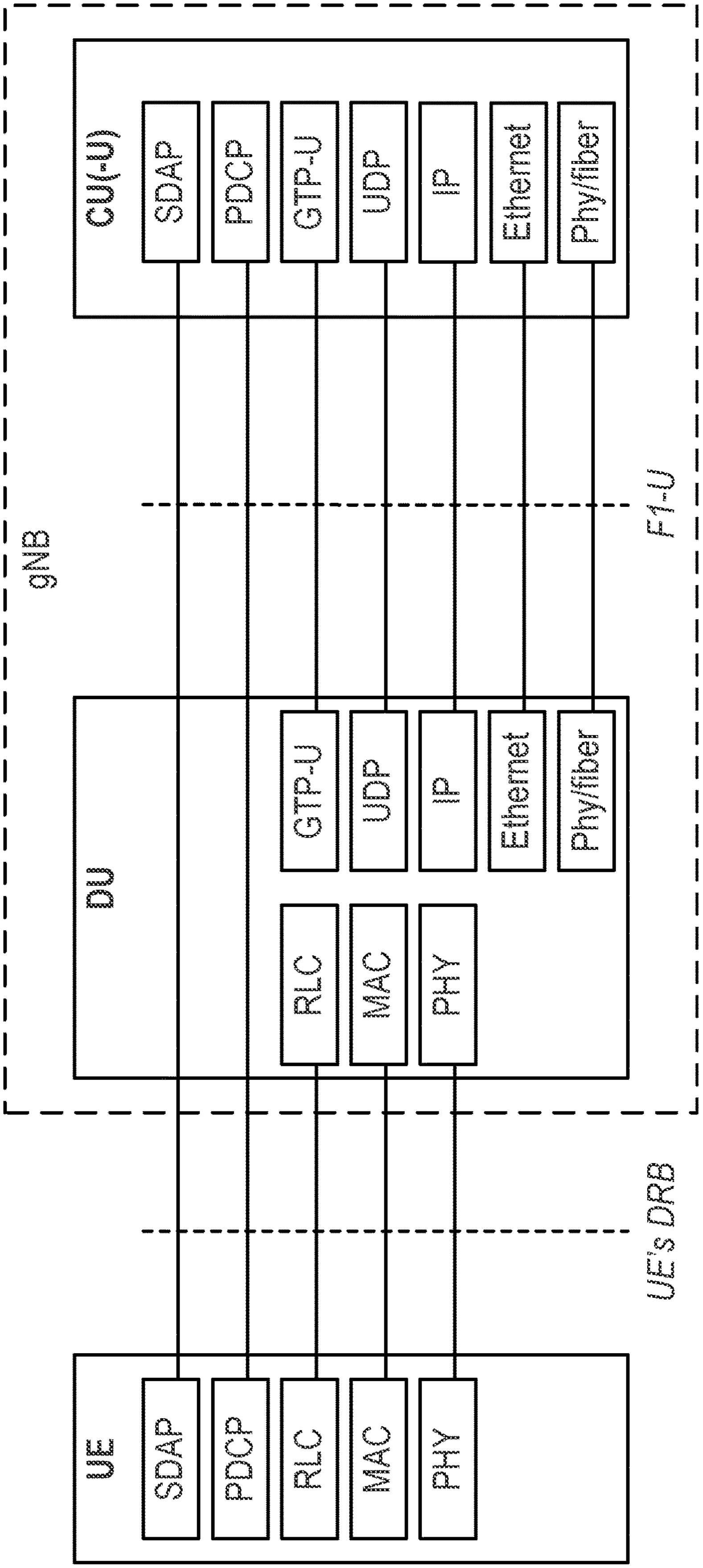
FIG. 4 shows a distribution of protocol layers for a gNB.
Figure 5:
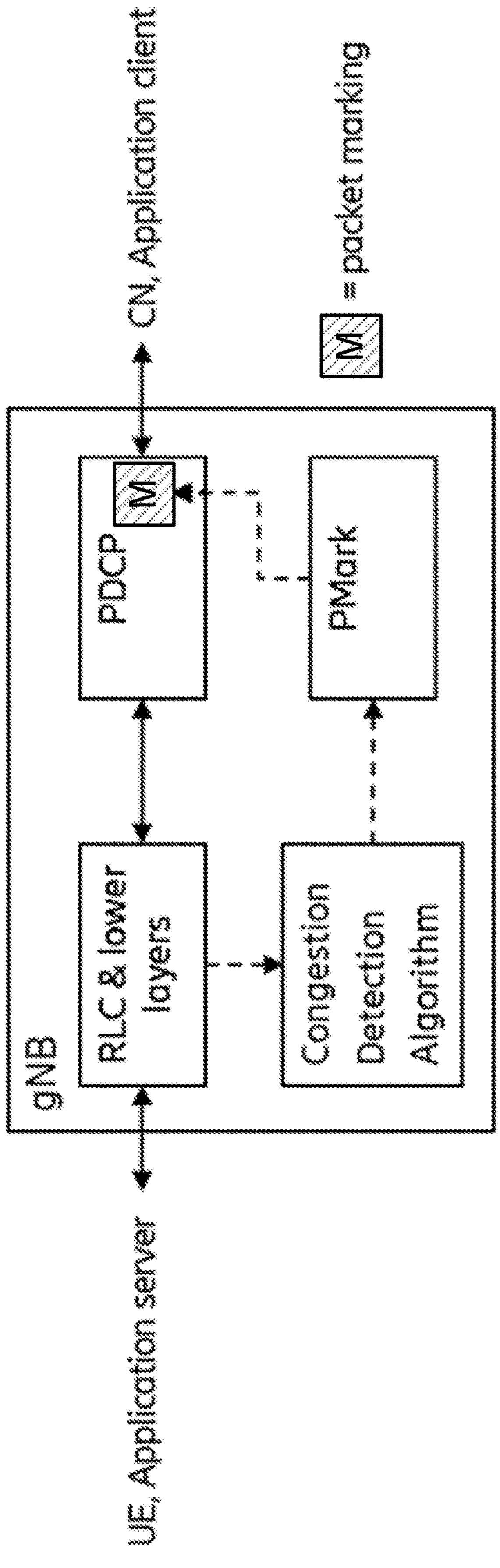
FIG. 5 shows an implementation of L4S functionality within a network node or base station.

FIG. 5 shows the implementation of L4S functionality within a network node or base station, such as a gNB or eNB. The core functions for L4S functionality are listed below:

| | |
|---|---|
| Packet marking | To mark IP packet as Congestion Experienced (CE) as specified in the L4S internet draft (specified above). It uses the output from the PMark to identify the proportion of packets to mark. The function has a deployment constraint, to be located where there is access to IP packet headers of the application data flow which implies an allocation at the PDCP entity. |
| Congestion detection algorithm (CDA) | To detect congestion and level of congestion in the data flow. Estimates if the (queue) delay target cannot be satisfied and if there's a deviation, to what extent. |
| PMark, marking probability calculation | To calculate the fraction of packets to mark as CE based on information from the CDA. As an example, the PMark function can have characteristics as outlined in FIG. 6, where the probability for marking increase linearly in relation to (queue) delay time. |

Figure 6:
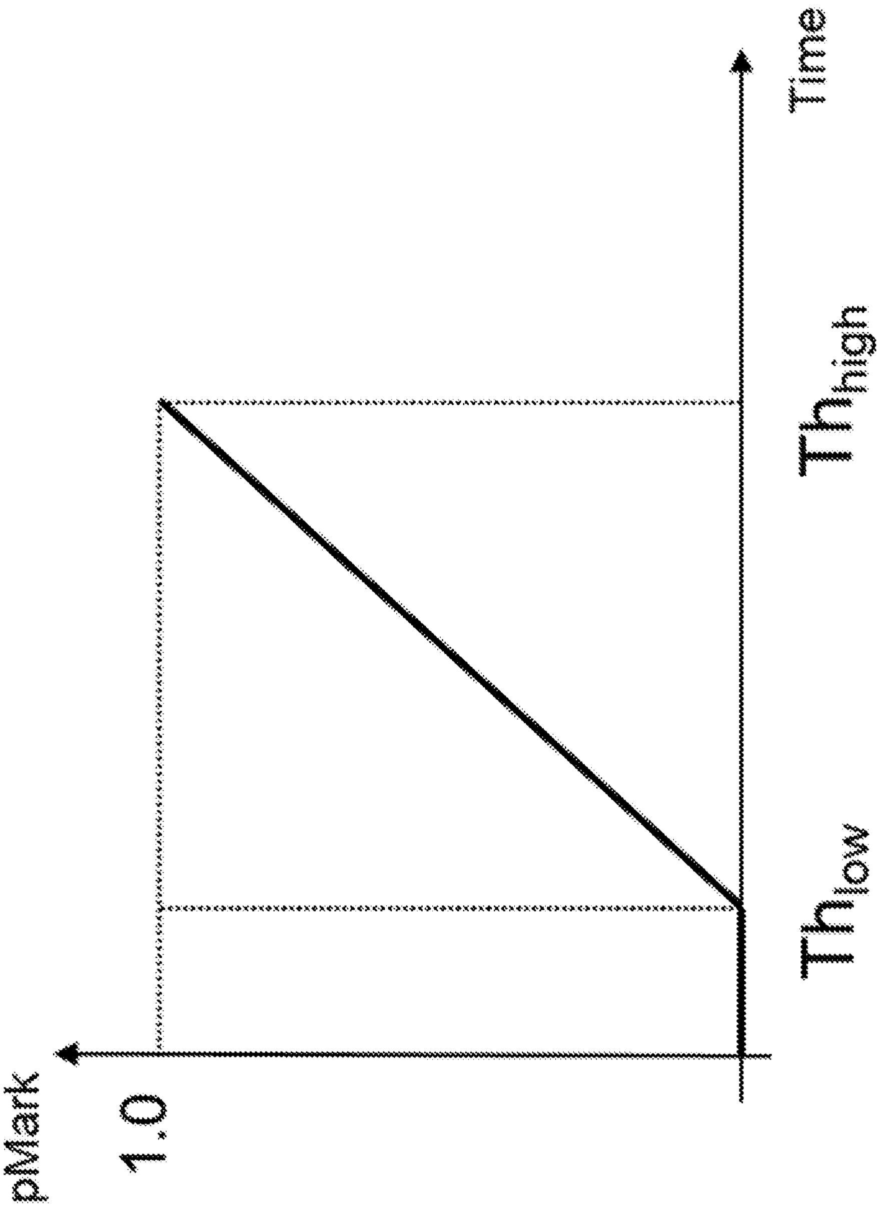
FIG. 6 shows the characteristics of a marking probability function, pMark, in accordance with some embodiments.

FIG. 6 shows the characteristics of the pMark function according to one embodiment of the disclosure. Those skilled in the art will appreciate that FIG. 6 shows just one possible implementation of the pMark function, and that other pMark functions are possible within the scope of the claims and/or embodiments appended hereto. For example, FIG. 6 shows a linear variation of the pMark function between low and high values (e.g., 0 and 1, respectively), for delay times between low and high threshold values ($Th_{low}$ and $Th_{high}$, respectively). At delay times below the lower threshold, the pMark function may have the low value; at delay times above the upper threshold, the pMark function may have the high value. Alternatively, the pMark function may vary nonlinearly; for example, the pMark function may vary in quantized steps as the time delay varies; the pMark function may vary as a curve or other function of the time delay experienced by the data packets of the connection. Other examples will naturally occur to those skilled in the art and embodiments of the present disclosure are not limited in that respect.

Figure 7:
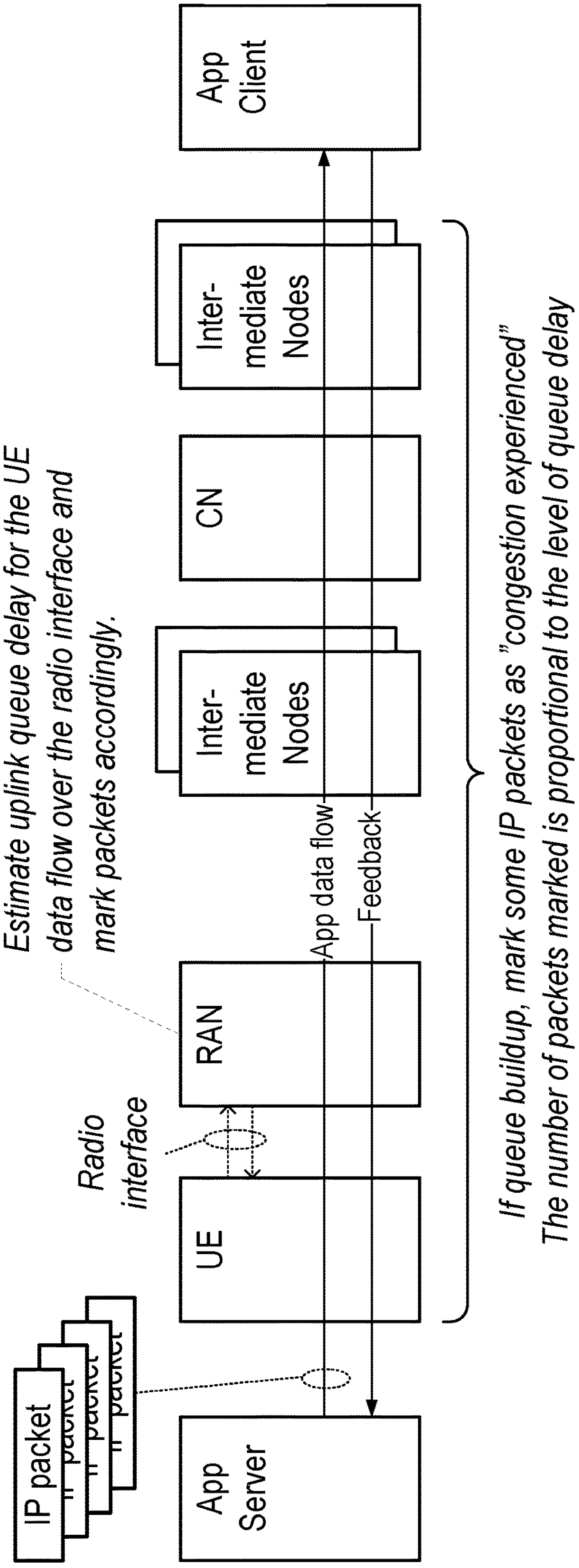
FIG. 7 shows an implementation of L4S within a Radio Access Network (RAN) in accordance with some embodiments.

FIG. 7 shows an implementation of L4S within RAN, according to embodiments of the disclosure. The gNB (which is responsible for scheduling the UE) can, based on UE transmitted Buffer Status Reports (BSR), estimate the UE output queue. The UE output queue, together with other metrics such as channel quality, cell load etc, can be used to compute the level of IP packet congestion markings to inject in the data flow towards the application client.

In a split gNB architecture (or a split bearer in dual- or multi-connectivity), the core functions in FIG. 5 are distributed between the DU and/or CU (secondary network node and/or master network node). The packet marking function may be collocated with the PDCP functionality in the CU, but there are different options for how to allocate the CDA and the PMark functions.

Figure 8:
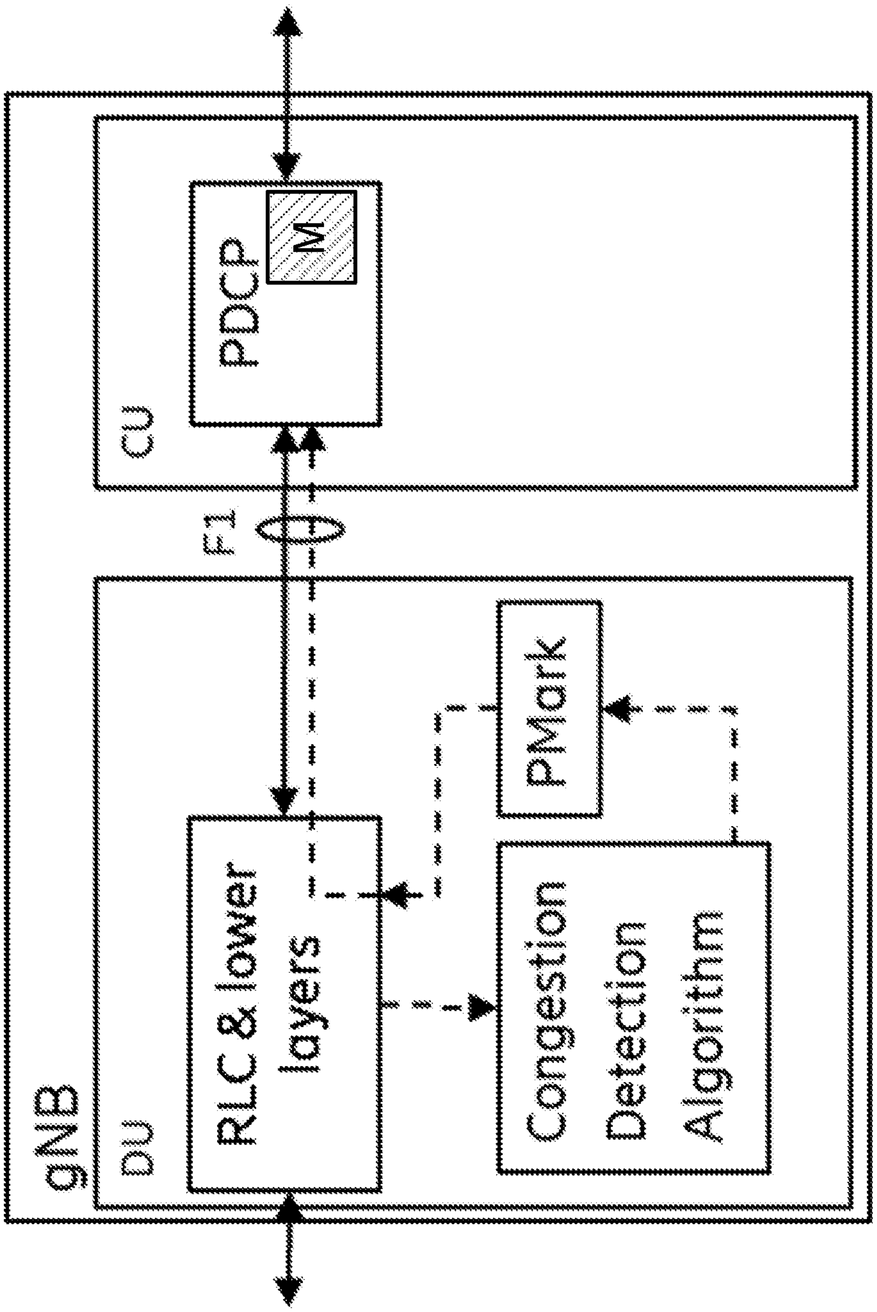
FIGS. 8-10 show gNBs in accordance with some embodiments.

FIG. 8 shows an embodiment according to the present disclosure, in which the CDA and pMark functions are located in the DU, and the packet marking function is located in the CU. The DU thus sends an indication of a proportion of packets to be marked with the congestion indicator to the CU, over the F1 interface.

Figure 9:
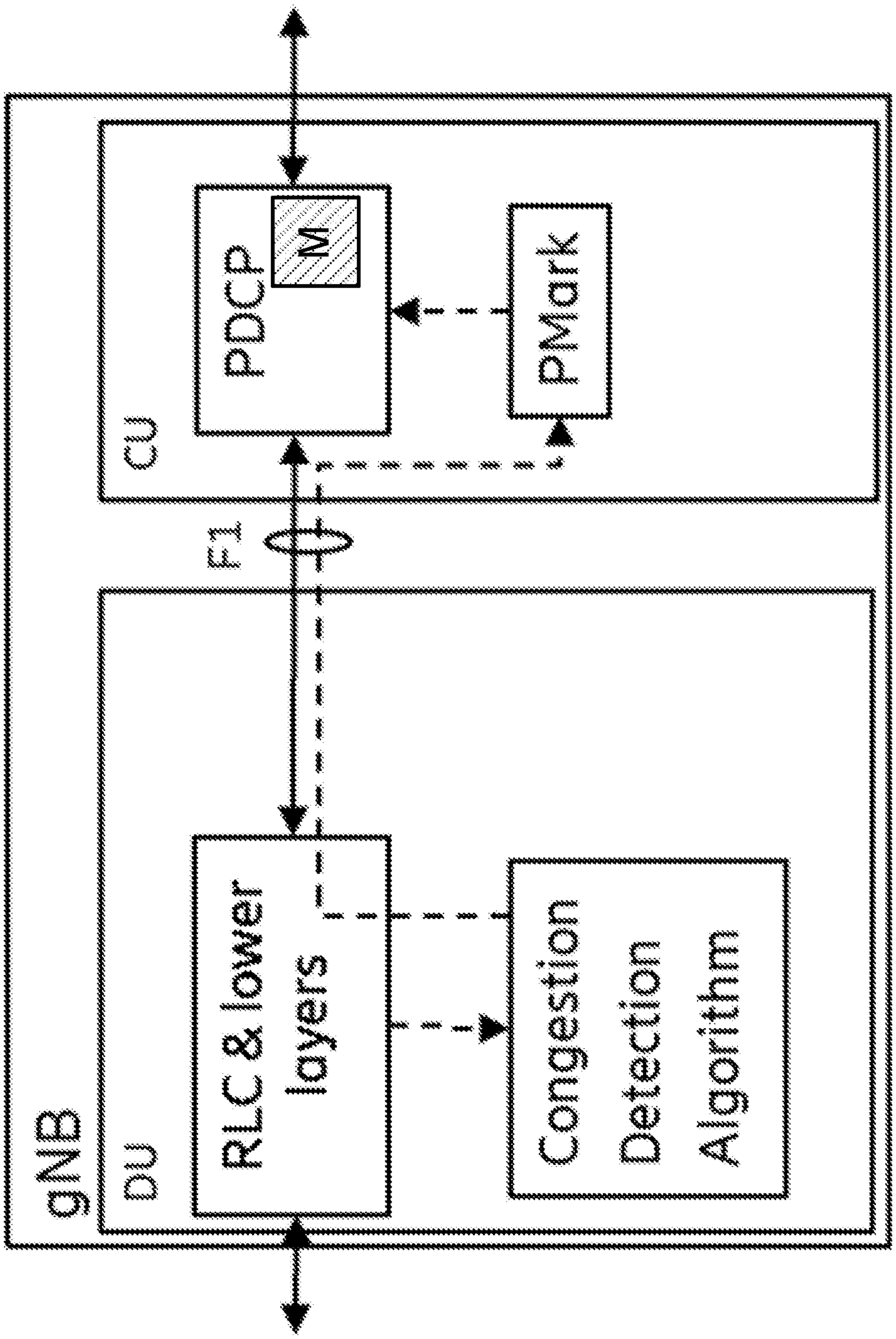

FIG. 9 shows an embodiment according to the present disclosure, in which the CDA is located in the DU, while the pMark and packet marking functions are located in the CU. The DU thus sends information, over the F1 interface to the CU, regarding a delay experienced by the packets of the uplink user plane flow. The PMark function uses this information to calculate a proportion of packets to be marked with the congestion indicator, and this proportion of packets is marked by the packet marking function in the PDCP entity.

Figure 10:
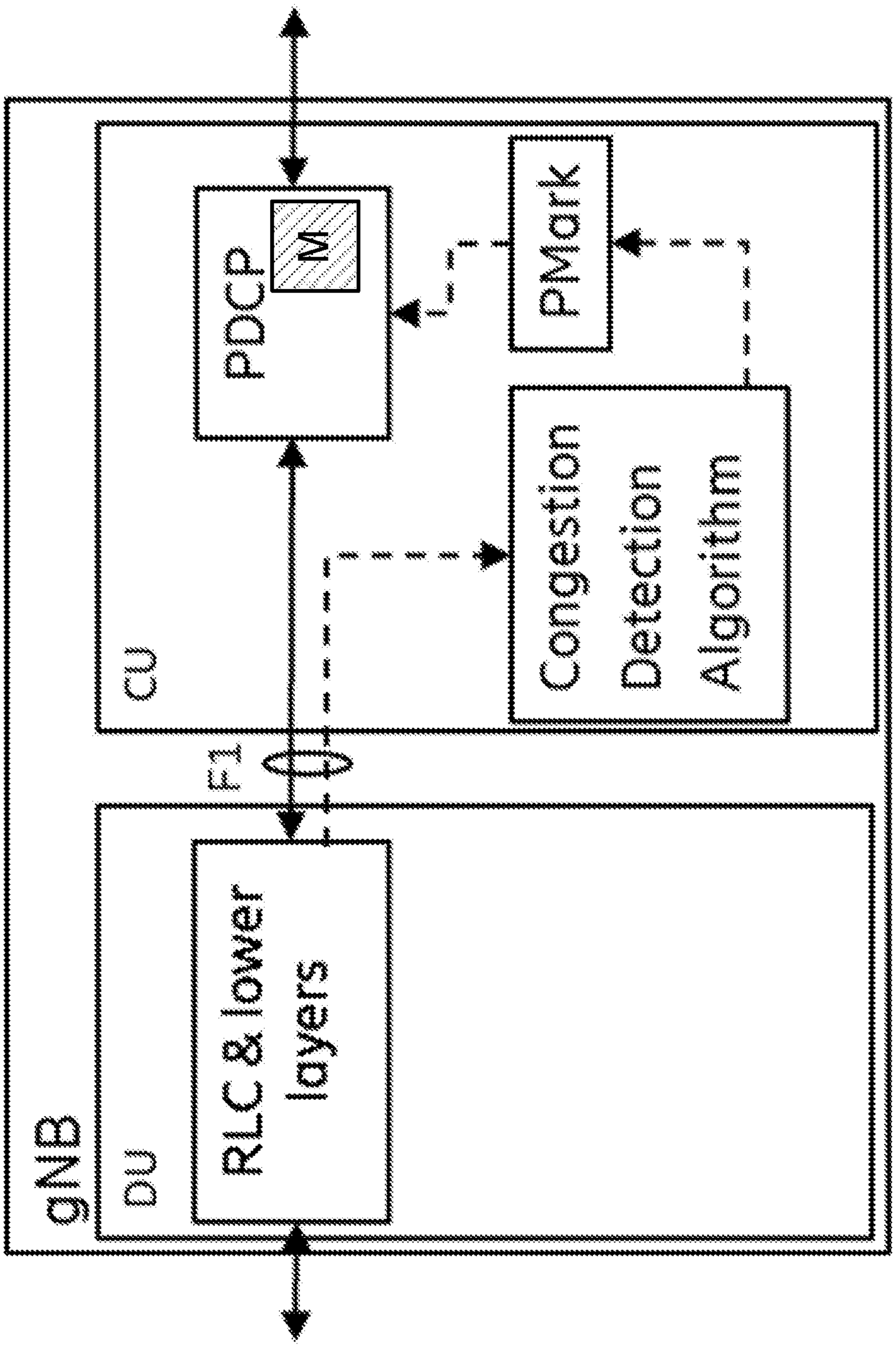

FIG. 10 shows an embodiment according to the present disclosure, in which the CDA, pMark and packet marking functions are located in the CU. The DU thus sends information, over the F1 interface to the CU, of CU data flow and/or DU-monitored performance metrics. This information is used by the CDA to calculate or estimate, for example, a delay experienced by packets of the uplink user plane flow. The PMark function uses the delay to calculate a proportion of packets to be marked with the congestion indicator, and this proportion of packets is marked by the packet marking function in the PDCP entity.

The embodiments described above with respect to FIGS. 8, 9 and 10 are labelled cases A, B and C respectively. Further detail regarding these embodiments is set out below.

Case A and B: CDA in DU

In both cases A and B, the gNB-DU may host the function determining whether UL resources are subject to congestion (e.g., CDA). This is possible because the gNB-DU receives buffer status reports (BSR) and also collects UL measurements revealing the radio quality of the UL channels. The gNB-DU is also aware of the rate at which RLC traffic coming from the UE is acknowledged and therefore it can deduce if congestion is due to bad radio links or due to lack of radio resources (or both). Further, the gNB-DU is aware of resource utilization, e.g. such as the information signalled over the F1-C interface to the gNB-CU via the RESOURCE STATUS UPDATE procedure. This information provides insights as to whether a potential congestion is occurring in UL and can be used by the gNB-DU to provide indications to the gNB-CU-UP on how to perform ECN marking.

Case A: CDA and PMark in DU, Send Marking Probability Over F1

As noted above, in case A the CDA and PMark functions are hosted in the DU (or secondary network node). In one embodiment of the disclosure, the information providing the marking probability can be added to the 3GPP TS 34.425 Assistance Information PDU, as shown below (underlined passages show additions to the relevant standard).

From 3GPP TS 38.425 v16.3.0 Section 5.5.2.3 Assistance Information Data (PDU Type 2)

This frame format is defined to allow the node hosting the NR PDCP entity to receive assistance information.

Table 2 shows the respective ASSISTANCE INFORMATION DATA frame.

TABLE 2

ASSISTANCE INFORMATION DATA (PDU Type 2) Format

| Bits 7 6 5 4 | 3 | 2 | 1 | 0 | Number of Octets |
|---|---|---|---|---|---|
| PDU Type (=2) | PDCP Dupl. Ind. | Assistance Info. Ind. | UL Delay Ind. | DL Delay Ind. | 1 |
| Spare | | | L4S Marking Probability Ind. | PDCP Duplication Activation Suggestion | 1 |
| Number of Assistance Information Fields | | | | | 0 or 1 |
| Assistance Information Type | | | | | 0 or (2*Number of Assistance Info Fields + sum of Number of octets for Radio Quality Assistance Information Fields) |
| Number of octets for Radio Quality Assistance Information Fields | | | | | |
| Radio Quality Assistance Information | | | | | |
| UL Delay DU Result | | | | | 0 or 4 |
| DL Delay DU Result | | | | | 0 or 4 |
| L4S Marking Probability | | | | | n |

L4S Marking Probability Indication

Description: This field indicates the presence of the L4S Marking Probability.

Value range: {0=L4S Marking Probability not present, 1=PDCP L4S Marking Probability present}.

Field length: 1 bit.

L4S Marking Probability

Description: This field indicates the probability with which UL IP packets should be marked with an LAS flag (i.e. ECN marking). For example, if the L4S marking Probability is set to 50, the node hosting PDCP should interpret this information as a recommendation to mark 50% of the UL IP packets in egress with the L4S flag.

Value range: {0 . . . 100}.

Field length: 1 octet.

The number n of octets used for the L4S marking probability can reflect the desired marking probability resolution. In the example above, 1 octet is used to represent the L4S Marking Probability. However, more octets may be allocated if it higher accuracy is desired. Based on the L4S Marking Probability information received in the Assistance Information, the CU-UP determines when to start to include ECN marking in the IP header in accordance with the received L4S Marking Probability value. Reception of Assistance Information with a different L4S Marking Probability value than previously received, may be used by the CU-UP to change the ECN marking accordingly. The lack of L4S Marking Probability in a subsequent Assistance Information may be interpreted by the CU-UP as an indication that the L4S Marking Probability is no longer applicable and ECN marking should therefore no longer be included in the IP header.

In another embodiment of the disclosure, the information added to the PDU Type 2 above, namely the L4S Marking Probability Indication and the L4S Marking Probability, may be added to the PDU Type 1 PDU, namely the DDDS. One advantage of this approach could be that the PDU Type 1 is likely to be received by the node hosting PDCP more often than PDU Type 2. Hence, by adding the L4S assistance information to this PDU type, a more frequent guidance on how to set L4S may be received by the gNB-CU-UP.

In another embodiment of the disclosure, an LAS congestion indication may be included as one new event in the Cause Value IE included in the PDU Type 1 defined in TS38.425. An example of how this new value can be included is reported below:

From 3GPP TS 38.425 v16.3.0 Section 5.5.3.23 Cause Value

Description: This parameter indicates specific events reported by the corresponding node.

Value range: {0=UNKNOWN, 1=RADIO LINK OUTAGE, 2=RADIO LINK RESUME, 3=UL RADIO LINK OUTAGE, 4=DL RADIO LINK OUTAGE, 5=UL RADIO LINK RESUME, 6=DL RADIO LINK RESUME, 7=L4S congestion Indication, 8-228=reserved for future value extensions, 229-255=reserved for test purposes}

As an alternative solution, a congestion marker, referred to herein as L4S Congestion Notification, may be added to the PDUs signaled from the gNB-DU to the gNB-CU or in general signaled from the node hosting lower layers to the node hosting PDCP (e.g., in a GTP-U Extension Header for UL GTP-U PDUs). That L4S Congestion Indication can be provided with each uplink PDU that contains an IP packet that is determined by the implementation specific congestion control algorithm to carry congestion indication (e.g., in the ECN field of that IP packet). If the uplink PDU contains more than one IP packet or it contains fragments of an IP packet, and if the L4S congestion Notification is added to the uplink PDU (e.g., in the GTP-U Extension Header), the node hosting PDCP, receiving the UL PDU, will mark all corresponding IP packets with a field (e.g., an ECN field) indicating congestion.

Case B: CDA in DU and PMark in CU. DU Delay Information Sent Over F1

In this embodiment of the disclosure, the gNB-DU provides DU delay information to the gNB-CU-UP, e.g., an indication of a delay experienced by packets of the uplink user plane flow. In one embodiment, the DU delay information reflects the time to 'empty' the UE outgoing buffer and send the data to gNB-CU-UP, i.e., the time is measured in DU from BSR reception to the data being sent on F1.

Figure 11:
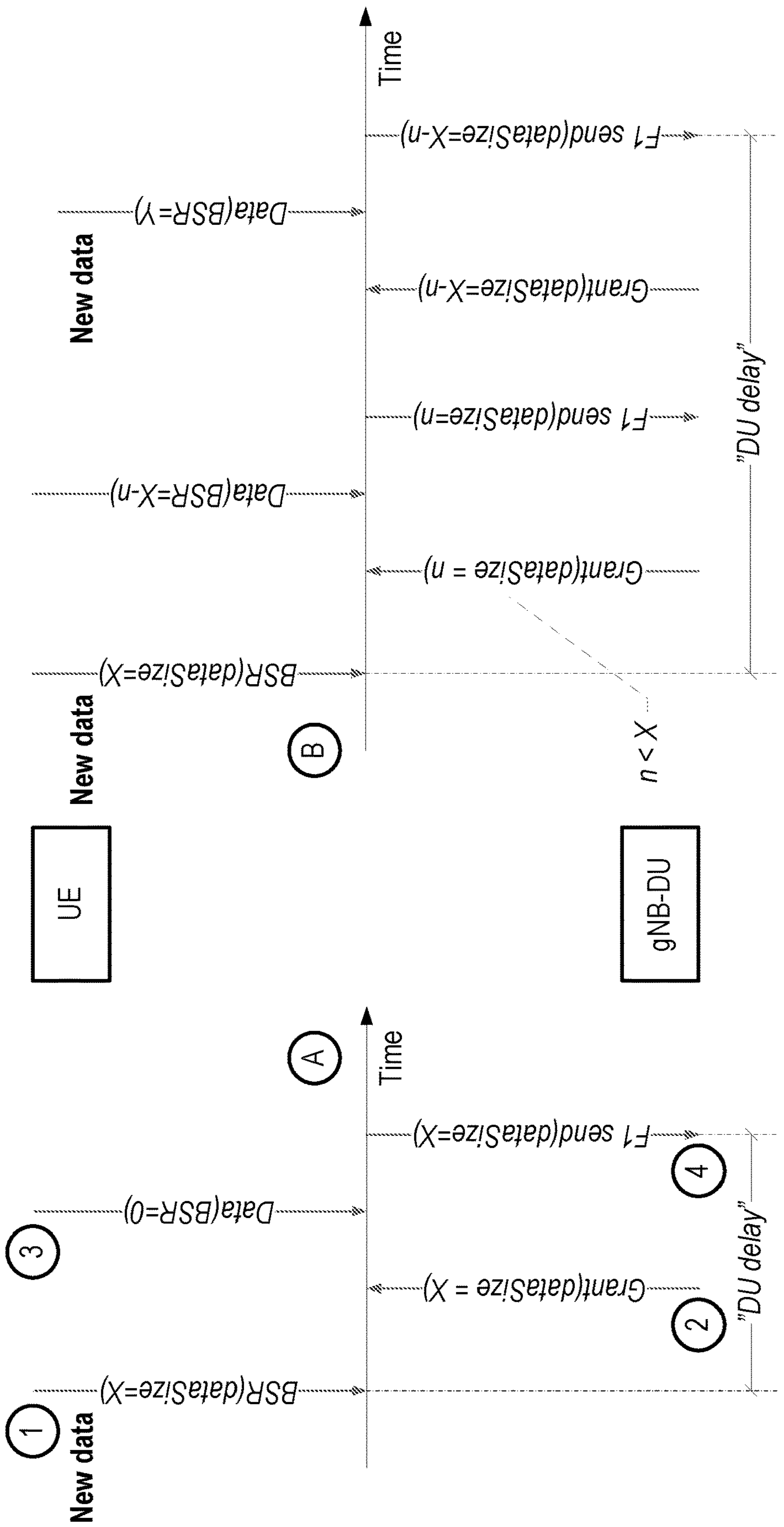
FIG. 11 shows timelines illustrating a principle for delay measurement for a Distributed Unit (DU) in accordance with some embodiments.

The principle for DU delay measurement is illustrated with timelines in FIG. 11. The left (example A) can be described as:

1. The UE sends a BSR (including data size) when it has data to send.
2. The gNB-DU responds with a grant, indicating data size and resources to use in an upcoming transmission.
3. The UE transmits the uplink data using the granted resources.
4. The gNB-DU processes the reception and sends the data over F1 to the gNB-CU.

The DU delay corresponds to the time from (1) to (4). As shown in FIG. 11, the UE data message may also include an updated BSR. In example (A), all data is granted, and no new data has arrived in the UE outgoing buffer. In example (B), several BSRs and UE data transmission are needed to empty the UE buffer, implying a longer DU delay.

The DU delay measurement can be included (piggy backed) together with the F1 data. Alternatively, it can be sent in separate messages, e.g. as a new information element in the ASSISTANCE INFORMATION (i.e., PDU type 2). The DU delay can also be averaged and sent less frequently compared to F1 data transmissions. Yet another option is to use an existing information element in an existing message but with a new interpretation, e.g. the UL Delay DU Result in ASSISTANCE INFORMATION (i.e., PDU type 2) may be redefined for this purpose.

As mentioned above, the gNB-DU has knowledge of the cell/traffic load, resource situation and radio channel quality, and based on this information the congestion detection algorithm (CDA) can adjust the DU delay according to the current and forecasted situation before sending it to the gNB-CU.

The PMark function in the gNB-CU uses the received DU delay information as input for calculation of the L4S marking probability, for example as described above with respect to FIG. 6.

Case C: CDA and PMark in CU, Monitoring/Analysis of CU Data Flow and/or DU-Monitored Performance Metrics Over F1

As noted above, in case C the CDA and PMark functions are hosted in the CU (or master network node). The DU, for example in light of the channel conditions monitored in UL, signals to the gNB-CU assistance information that guides the UP on how to set L4S information in UL traffic.

In this embodiment, the node hosting PDCP (e.g. the gNB-CU-UP) may rely on information contained in PDU Type 1 and/or PDU Type 2 to deduce whether ECN marking should be set or not in the UL IP Packets in egress. The information that the node hosting PDCP may use for such purpose may be one or more of the following:

The actual UL data flow into the gNB-CU received via the F1-U interface can be monitored and used to estimate the congestion related latency that occur when the number of bits to transfer is limited by the capacity on the air/radio interface. (The reason for the limit could be shadow fading, interference, scheduling of other users or an aim from the application to temporary send much data.)

The UL Delay DU Result contained in PDU Type 2. This information may indicate to the node hosting PDCP that delay over the Uu interface in UL is excessive and this may signify that congestion is taking place. Note that a gNB-CU-UP may also make use of the UL D1 Result received over the F1 interface from the gNB-CU-CP, which represents the UL delay experienced by the UE for traffic relative to a specific DRB. Such delay measure includes the time between ingress of a PDU into the PDCP buffer, to the time of egress of the PDU over the air or radio interface. The UL D1 Result IE is received by the gNB-CU-UP in the E1AP information structure shown in Appendix 1:

Assistance Information Type and Radio Quality Assistance Information contained in PDU Type 2: This information may provide to the gNB-CU-UP information relative to the UL channel conditions. An example of such information is the UL Radio Quality Index Cause Value contained in PDU Type 1: This IE may include events that help the gNB-CU-UP to determine the status of the UL channels, such as the UL RADIO LINK OUTAGE event indication, which indicates that the radio link is not available for transmission in UL and that may signify the presence of an UL congestion.

Furthermore, the gNB-CU-UP may use measures of the F1-U round trip time transmission delays to deduce whether a congestion is due to F1-U resource limitations. Such RTT measurements can be achieved in different ways, such as by using the GTP-U echo function, which generates a GTP-U UL PDU when a GTP-U DL PDU is received, or by using the Report Polling Flag or the Assistance Information Report Polling Flag, which can be included in the (DL) PDU Type 0 and that trigger an immediate reporting from the gNB-DU of PDU Type 1 and PDU Type 2 packets. Hence the gNB-CU-UP can calculate the RTT between transmission of the PDU including the polling flag and reception of the associated report and by that deducing the F1-U delay.

For use cases of split RAN architectures, where the node hosting lower layers is the gNB-DU and the node hosting PDCP consists of the gNB-CU, namely in cases where the gNB-CU-UP and the gNB-CU-CP are not split, another piece of information that the gNB-CU may use to deduce whether there is a congestion for the UL channels is the information received over the F1-C interface by means of the RESOURCE STATUS UPDATE message. This message contains per cell resource information concerning, e.g. the utilization of PRBs, the availability of resources in the cell, the number of Active UEs in the cell, the number of RRC connections in a cell, transport level traffic load indications and more. The Resource Status Update message is seen in appendix 2.

By receiving one or more of the information listed above, the node hosting PDCP may deduce the presence of a congestion situation over the UL communication channels for a specific DRB. As a consequence, the node hosting PDCP may decide to apply ECN marking to some/all of the UL IP packets in egress for the corresponding DRB traffic.

In one embodiment of the disclosure, the node hosting the lower layers (e.g. the gNB-DU) may host functionalities aimed at influencing how the ECN marking should be applied by the node hosting PDCP (e.g. the gNB-CU). In such case the node hosting lower layers may set, adapt or configure some of the parameters listed above in order to produce a specific ECN marking at the node hosting PDCP. For example, some parameters could be set to values that would trigger ECN marking at the node hosting PDCP. Some of the parameters that the node hosting lower layers may set are:

Cause Value in PDU Type 1: in this case, events such as UL radio link outages may be declared for the purpose of triggering ECN marking Resource Status Update information: in this case, information such as Composite Available Capacity and Radio Resource Status may be set to values that allow the node hosting PDCP to determine that a congestion is in place and therefore specific ECN marking policies need to be applied

Appendix 1: E1AP Information Structure

From 3GPP TS 38.473 v 16.6.0 (F1 application protocol) section 9.2.2.19 GNB-CU-CP Measurement Results Information This message is sent to the gNB-CU-UP to provide the measurement result received by the gNB-CU-CP.

Direction: gNB-CU-CP→gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| DRB Measurement Results Information List | | 1 | | | YES | reject |
| >DRB Measurement Results Information Item | | 1 . . . <maxnoofDRBs> | | | EACH | reject |
| >>DRB ID | M | | 9.3.1.16 | | — | |
| >> UL D1 Result | O | | INTEGER (0 . . . 10000, . . .) | The unit is: 0.1 ms | — | |

Appendix 2: Resource Status Update Message

From 3GPP TS 38.473 v 16.6.0 (F1 application protocol) section 9.2.1.23 Resource Status Update This message is sent by gNB-DU to gNB-CU to report the results of the requested measurements.

Direction: gNB-DU→gNB-CU.

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| gNB-CU Measurement ID | M | | INTEGER (1 . . . 4095, . . .) | Allocated by gNB-CU | YES | reject |
| gNB-DU Measurement ID | M | | INTEGER (1 . . . 4095, . . .) | Allocated by gNB-DU | YES | ignore |
| Hardware Load Indicator | O | | 9.3.1.136 | | YES | ignore |
| TNL Capacity Indicator | O | | 9.3.1.128 | | YES | ignore |
| Cell Measurement Result | | 0 . . . 1 | | | YES | ignore |
| >Cell Measurement Result Item | | 1 . . . <maxCellingNBDU> | | | — | |
| >>Cell ID | M | | NR CGI 9.3.1.12 | | — | |
| >>Radio Resource Status | O | | 9.3.1.129 | | — | |
| >>Composite Available Capacity Group | O | | 9.3.1.130 | | — | |
| >>Slice Available Capacity | O | | 9.3.1.134 | | — | |
| >>Number of Active UEs | O | | 9.3.1.135 | | — | |

Figure 12:
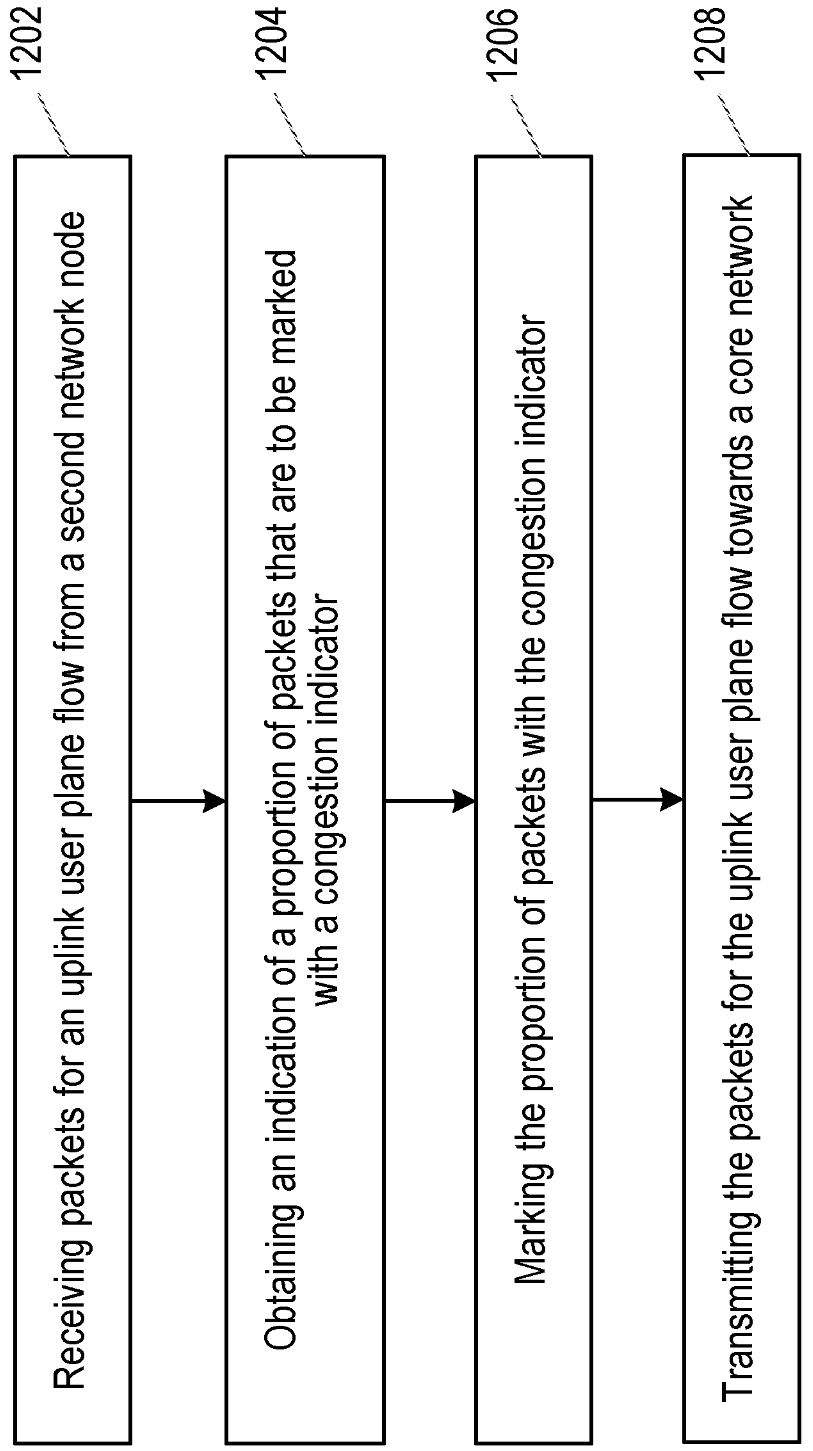
FIG. 12 depicts a method in accordance with particular embodiments.

FIG. 12 depicts a method in accordance with particular embodiments. The method 12 may be performed by a first network node within a radio network (e.g. a centralized unit within a distributed base station (CU, CU-UP, etc), a master node, MeNB, MgNB, etc, exemplified by the network node 1460 or 1600 as described later with reference to FIGS. 14 and 16 respectively). The method should be read in the context of FIGS. 5 to 11 above. In particular, the method described with respect to FIG. 12 may correspond to the actions of the CU or master network node described above with respect to those Figures.

The first network node handles one or more first layers of a protocol stack for an uplink connection between a wireless device and the radio network. For example, the first network node may host one or more of the PDCP and IP layers of the protocol stack. The first network node is communicatively coupled to a second network node (e.g., DU, secondary node, SeNB, SgNB, etc) handling one or more second layers of the protocol stack for the uplink connection. The one or more second layers are lower than the one or more first layers. For example, the second network node may host one or more of: RLC, MAC and PHY layers of the protocol stack.

The method begins at step 1202, in which the first network node receives, from the second network node, packets for an uplink user plane flow over the uplink connection between the wireless device and the radio network. Data radio bearers (DRBs) may be used to control and/or organize the UL user plane flow.

In step 1204, the first network node obtains an indication of a proportion of packets within the uplink user plane flow that are to be marked with a congestion indicator. Note that the packets that are to be marked with the congestion indicator may be at a different layer of the protocol stack than the packets received from the second network node. For example, the packets received from the second network node may be RLC PDUs. The packets to be marked with a congestion indicator may be PDCP PDUs or IP packets. The proportion is based on a delay experienced by packets of the uplink user plane flow sent to the second network node (e.g., by the wireless device).

In step 1206, the first network node marks the proportion of the packets with the congestion indicator (e.g., an LAS indicator, such as an ECN field). This step may be performed within a PDCP layer in the first network node.

The packets may be marked using probabilistic techniques. For example, the indication of the proportion of packets to be marked with the congestion indicator may comprise an indication of a probability, with the first network node marking the packets in accordance with the probability.

In step 1208, the first network node transmits the packets for the uplink user plane flow, including the proportion of packets marked with the congestion indicator, towards a core network of the radio network. For example, the packets may be transmitted over a backhaul network to the core network.

Those skilled in the art will appreciate that step 1204 may vary in accordance, for example, with the different cases A, B and C described above.

In case A, for example, where the CDA and PMark functions are hosted in the second network node, step 1204 may comprise receiving the indication of the proportion of packets (e.g., in the form of a probability) that are to be marked with the congestion indicator from the second network node, e.g., over an F1, X2 or Xn interface. The indication may be included in an assistance information (Type 2) PDU or a downlink data delivery status (Type 1) PDU, for example, as described above.

In case B, for example, where the CDA function is hosted in the second network node and the PMark function is hosted in the first network node, step 1204 may comprise calculating the proportion of packets based on the delay experienced by packets of the uplink user plane flow sent to the second network node. In this example, the first network node may receive, from the second network node, an indication of the delay experienced by those packets in their transmission from the wireless device (e.g., UE) to the first network node via the second network node. For example, the delay may comprise the delay between transmission of a buffer status report by the wireless device to the second network node, and transmission of data corresponding to the buffer status report by the second network node to the first network node. Additionally or alternatively, the delay may comprise the delay between transmission of a buffer status report by the wireless device to the second network node, and transmission of all data indicated in the buffer status report by the second network node to the first network node. Further detail can be found above in the description with respect to FIG. 11.

The indication of the delay may be piggybacked within data for the uplink user plane flow, e.g., within the packets received in step 1202, or received in a PDU from the second network node such as an assistance information PDU. In either case, the value of the delay reported to the first network node may be averaged over multiple measured instances of the delay by the second network node.

In case C, where the CDA and PMark functions are hosted in the first network node, step 1204 may also comprise calculating the proportion of packets based on the delay experienced by packets of the uplink user plane flow sent to the second network node. In this embodiment, rather than receiving the delay directly from the first network node, the first network node may receive information from the second network node or a third network node (e.g., a CU-CP node), enabling the first network node to calculate, estimate or infer the delay experienced by packets of the uplink user plane flow. The information received from the second network node may comprise one or more of: uplink data flow; uplink delay over a radio interface; one or more radio quality metrics for a connection between the wireless device and the second network node; an indication of a status of one or more uplink channels between the wireless device and the second network node; an indication of a round-trip time for transmissions between the first network node and the second network node. The information received from the third network node (which may relate to resources utilized in a cell served by the second network node) may comprise one or more of: an indication of a utilization of physical resource blocks; an indication of the availability of resources in the cell; a number of active wireless devices in the cell; a number of RRC connections in the cell; and one or more transport level traffic load indications.

In a yet further embodiment, a first congestion indicator may be added to the PDUs signaled from the second network node to the first network node. The first congestion marker (which may be provided, e.g., in a GTP-U Extension Header for UL GTP-U PDUs) may be provided with each uplink PDU that contains an IP packet that is determined by the congestion control algorithm (in the second network node) to carry a second congestion indicator (e.g., in the ECN field of that IP packet). If the uplink PDU contains more than one IP packet or it contains fragments of an IP packet, and if the first congestion indicator is added to the uplink PDU (e.g., in the GTP-U Extension Header), the node hosting PDCP, receiving the UL PDU, will mark all corresponding IP packets within the uplink PDU with a second congestion indicator (e.g., an ECN field).

Figure 13:
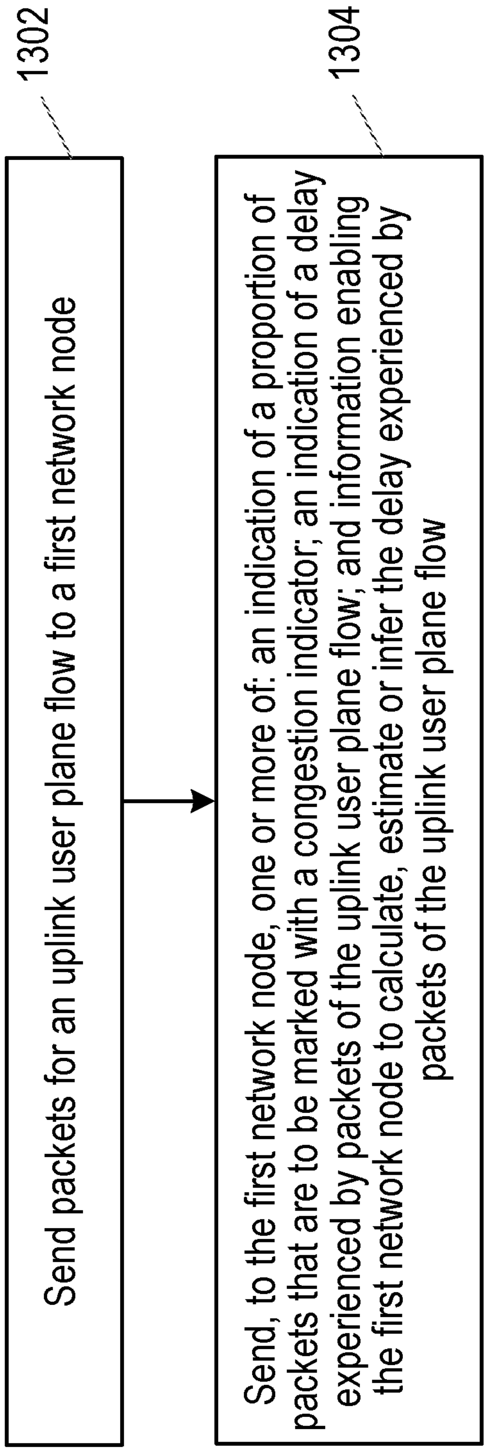
FIG. 13 depicts a method in accordance with particular embodiments.

FIG. 13 depicts a method in accordance with particular embodiments. The method 13 may be performed by a second network node (e.g. a distributed unit within a distributed base station (CU, CU-UP, etc), a secondary node, SeNB, SgNB, etc, exemplified by the network node 1460 or 1600 as described later with reference to FIGS. 14 and 16 respectively). The method should be read in the context of FIGS. 5 to 11 above. In particular, the method described with respect to FIG. 13 may correspond to the actions of the DU or secondary network node described above with respect to those Figures.

The second network node handles one or more second layers of a protocol stack for an uplink connection between a wireless device and the radio network. For example, the second network node may host one or more of: RLC, MAC and PHY layers of the protocol stack. The second network node is communicatively coupled to a first network node (e.g., CU, master node, MeNB, MgNB, etc) handling one or more first layers of the protocol stack for the uplink connection. The one or more second layers are lower than the one or more first layers. For example, the first network node may host one or more of the PDCP and IP layers of the protocol stack.

The method begins at step 1302, in which the second network node sends, to the first network node, packets for an uplink user plane flow over the uplink connection between the wireless device and the radio network.

In step 1304, the second network node sends, to the first network node, one or more of: an indication of a proportion of packets within the uplink user plane flow over the uplink connection that are to be marked with a congestion indicator, wherein the proportion is based on a delay experienced by packets of the uplink user plane flow sent by the wireless device to the second network node; an indication of the delay experienced by packets of the uplink user plane flow sent by the wireless device to the second network node; and information enabling the first network node to calculate or estimate the delay experienced by packets of the uplink user plane flow sent by the wireless device to the second network node.

Those skilled in the art will appreciate that step 1304 may vary in accordance, for example, with the different cases A, B and C described above.

In case A, for example, where the CDA and PMark functions are hosted in the second network node, step 1304 may comprise sending the indication of the proportion of packets (e.g., in the form of a probability) that are to be marked with the congestion indicator to the first network node, e.g., over an F1, X2 or Xn interface. The indication may be included in an assistance information (Type 2) PDU or a downlink data delivery status (Type 1) PDU, for example, as described above.

In case B, for example, where the CDA function is hosted in the second network node and the PMark function is hosted in the first network node, step 1304 may comprise sending, to the first network node, an indication of the delay experienced by those packets in their transmission from the wireless device (e.g., UE) to the first network node via the second network node. For example, the delay may comprise the delay between transmission of a buffer status report by the wireless device to the second network node, and transmission of data corresponding to the buffer status report by the second network node to the first network node. Additionally or alternatively, the delay may comprise the delay between transmission of a buffer status report by the wireless device to the second network node, and transmission of all data indicated in the buffer status report by the second network node to the first network node. Further detail can be found above in the description with respect to FIG. 11.

The indication of the delay may be piggybacked within data for the uplink user plane flow, e.g., within the packets sent in step 1302, or sent in a PDU from the second network node such as an assistance information PDU. In either case, the value of the delay reported to the first network node may be averaged over multiple measured instances of the delay.

In case C, where the CDA and PMark functions are hosted in the first network node, step 1304 may comprise sending information to the first network node, enabling the first network node to calculate, estimate or infer the delay experienced by packets of the uplink user plane flow. The information sent to the first network node may comprise one or more of: uplink data flow; uplink delay over a radio interface; one or more radio quality metrics for a connection between the wireless device and the second network node; an indication of a status of one or more uplink channels between the wireless device and the second network node; an indication of a round-trip time for transmissions between the first network node and the second network node.

In a yet further embodiment, a first congestion indicator may be added to the PDUs signaled from the second network node to the first network node. The first congestion marker (which may be provided, e.g., in a GTP-U Extension Header for UL GTP-U PDUs) may be provided with each uplink PDU that contains an IP packet that is determined by the congestion control algorithm (in the second network node) to carry a second congestion indicator (e.g., in the ECN field of that IP packet). If the uplink PDU contains more than one IP packet or it contains fragments of an IP packet, and if the first congestion indicator is added to the uplink PDU (e.g., in the GTP-U Extension Header), the node hosting PDCP, receiving the UL PDU, will mark all corresponding IP packets within the uplink PDU with a second congestion indicator (e.g., an ECN field).

Figure 14:
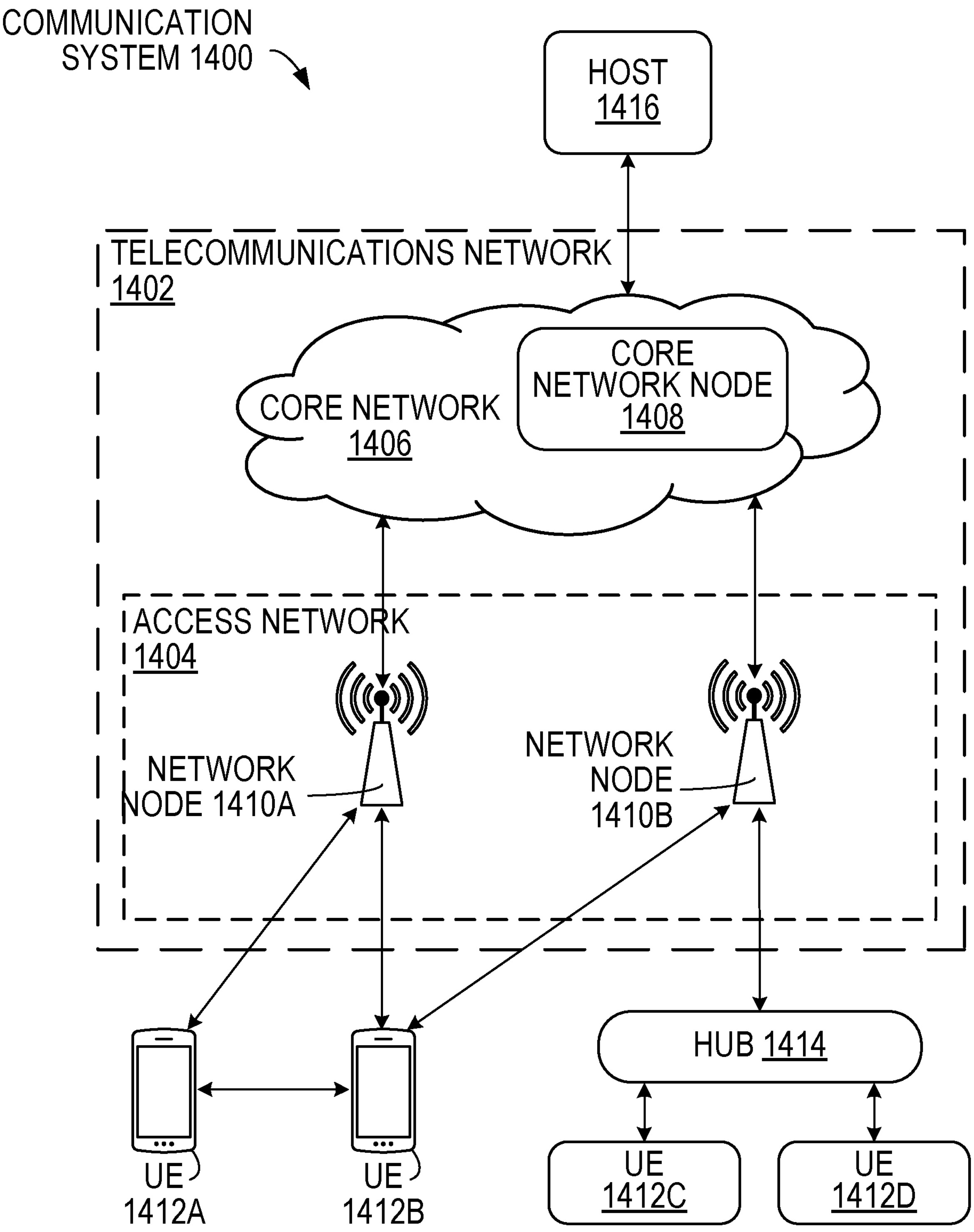
FIG. 14 shows an example of a communication system in accordance with some embodiments.

FIG. 14 shows an example of a communication system 1400 in accordance with some embodiments.

In the example, the communication system 1400 includes a telecommunication network 1402 that includes an access network 1404, such as a radio access network (RAN), and a core network 1406, which includes one or more core network nodes 1408. The access network 1404 includes one or more access network nodes, such as network nodes 1410*a* and 1410*b* (one or more of which may be generally referred to as network nodes 1410), or any other similar 3rd Generation Partnership Project (3GPP) access node or non-3GPP access point. The network nodes 1410 facilitate direct or indirect connection of user equipment (UE), such as by connecting UEs 1412*a*, 1412*b*, 1412*c*, and 1412*d* (one or more of which may be generally referred to as UEs 1412) to the core network 1406 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1400 may include any number of wired or wireless networks, network nodes, UEs, and/or any other components or systems that may facilitate or participate in the communication of data and/or signals whether via wired or wireless connections. The communication system 1400 may include and/or interface with any type of communication, telecommunication, data, cellular, radio network, and/or other similar type of system.

The UEs 1412 may be any of a wide variety of communication devices, including wireless devices arranged, configured, and/or operable to communicate wirelessly with the network nodes 1410 and other communication devices. Similarly, the network nodes 1410 are arranged, capable, configured, and/or operable to communicate directly or indirectly with the UEs 1412 and/or with other network nodes or equipment in the telecommunication network 1402 to enable and/or provide network access, such as wireless network access, and/or to perform other functions, such as administration in the telecommunication network 1402.

In the depicted example, the core network 1406 connects the network nodes 1410 to one or more hosts, such as host 1416. These connections may be direct or indirect via one or more intermediary networks or devices. In other examples, network nodes may be directly coupled to hosts. The core network 1406 includes one more core network nodes (e.g., core network node 1408) that are structured with hardware and software components. Features of these components may be substantially similar to those described with respect to the UEs, network nodes, and/or hosts, such that the descriptions thereof are generally applicable to the corresponding components of the core network node 1408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1416 may be under the ownership or control of a service provider other than an operator or provider of the access network 1404 and/or the telecommunication network 1402, and may be operated by the service provider or on behalf of the service provider. The host 1416 may host a variety of applications to provide one or more services. Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1400 of FIG. 14 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1402 is a cellular network that implements 3GPP standardized features. Accordingly, the telecommunications network 1402 may support network slicing to provide different logical networks to different devices that are connected to the telecommunication network 1402. For example, the telecommunications network 1402 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1412 are configured to transmit and/or receive information without direct human interaction. For instance, a UE may be designed to transmit information to the access network 1404 on a predetermined schedule, when triggered by an internal or external event, or in response to requests from the access network 1404. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example illustrated in FIG. 14, the hub 1414 communicates with the access network 1404 to facilitate indirect communication between one or more UEs (e.g., UE 1412*c* and/or 1412*d*) and network nodes (e.g., network node 1410*b*). In some examples, the hub 1414 may be a controller, router, a content source and analytics node, or any of the other communication devices described herein regarding UEs. For example, the hub 1414 may be a broadband router enabling access to the core network 1406 for the UEs. As another example, the hub 1414 may be a controller that sends commands or instructions to one or more actuators in the UEs. Commands or instructions may be received from the UEs, network nodes 1410, or by executable code, script, process, or other instructions in the hub 1414. As another example, the hub 1414 may be a data collector that acts as temporary storage for UE data and, in some embodiments, may perform analysis or other processing of the data. As another example, the hub 1414 may be a content source. For example, for a UE that is a VR headset, display, loudspeaker or other media delivery device, the hub 1414 may retrieve VR assets, video, audio, or other media or data related to sensory information via a network node, which the hub 1414 then provides to the UE either directly, after performing local processing, and/or after adding additional local content. In still another example, the hub 1414 acts as a proxy server or orchestrator for the UEs, in particular in if one or more of the UEs are low energy IoT devices.

The hub 1414 may have a constant/persistent or intermittent connection to the network node 1410*b*. The hub 1414 may also allow for a different communication scheme and/or schedule between the hub 1414 and UEs (e.g., UE 1412*c* and/or 1412*d*), and between the hub 1414 and the core network 1406. In other examples, the hub 1414 is connected to the core network 1406 and/or one or more UEs via a wired connection. Moreover, the hub 1414 may be configured to connect to an M2M service provider over the access network 1404 and/or to another UE over a direct connection. In some scenarios, UEs may establish a wireless connection with the network nodes 1410 while still connected via the hub 1414 via a wired or wireless connection. In some embodiments, the hub 1414 may be a dedicated hub—that is, a hub whose primary function is to route communications to/from the UEs from/to the network node 1410*b*. In other embodiments, the hub 1414 may be a non-dedicated hub—that is, a device which is capable of operating to route communications between the UEs and network node 1410*b*, but which is additionally capable of operating as a communication start and/or end point for certain data channels.

Figure 15:
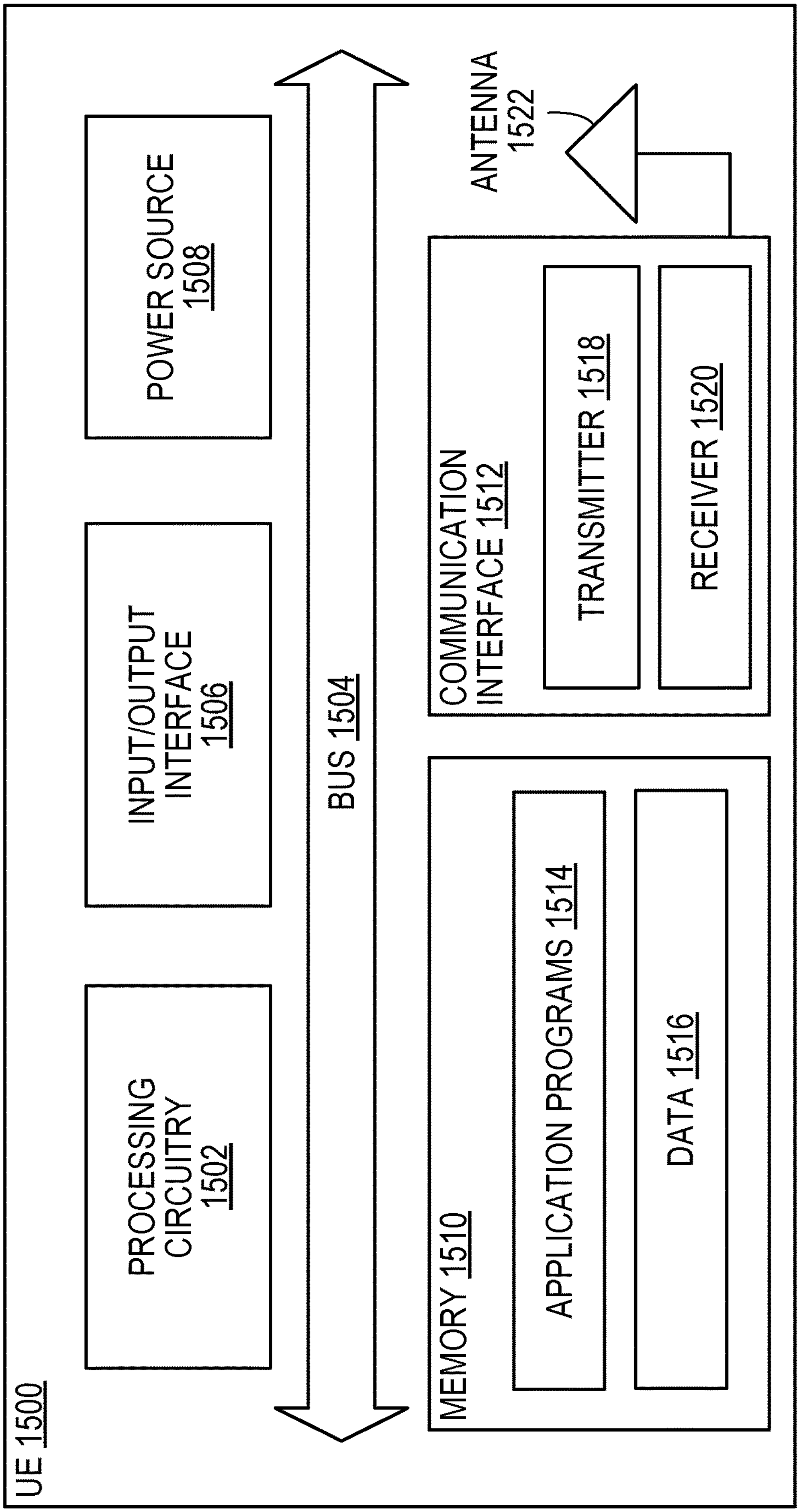
FIG. 15 shows a UE in accordance with some embodiments.

FIG. 15 shows a UE 1500 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1500 includes processing circuitry 1502 that is operatively coupled via a bus 1504 to an input/output interface 1506, a power source 1508, a memory 1510, a communication interface 1512, and/or any other component, or any combination thereof. Certain UEs may utilize all or a subset of the components shown in FIG. 15. The level of integration between the components may vary from one UE to another UE. Further, certain UEs may contain multiple instances of a component, such as multiple processors, memories, transceivers, transmitters, receivers, etc.

The processing circuitry 1502 is configured to process instructions and data and may be configured to implement any sequential state machine operative to execute instructions stored as machine-readable computer programs in the memory 1510. The processing circuitry 1502 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1502 may include multiple central processing units (CPUs). The processing circuitry 1502 may be operable to provide, either alone or in conjunction with other UE 1500 components, such as the memory 1510, UE 1500 functionality.

In the example, the input/output interface 1506 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1500. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1508 is structured as a battery or battery pack. Other types of power sources, such as an external power source (e.g., an electricity outlet), photovoltaic device, or power cell, may be used. The power source 1508 may further include power circuitry for delivering power from the power source 1508 itself, and/or an external power source, to the various parts of the UE 1500 via input circuitry or an interface such as an electrical power cable. Delivering power may be, for example, for charging of the power source 1508. Power circuitry may perform any formatting, converting, or other modification to the power from the power source 1508 to make the power suitable for the respective components of the UE 1500 to which power is supplied.

The memory 1510 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1510 includes one or more application programs 1514, such as an operating system, web browser application, a widget, gadget engine, or other application, and corresponding data 1516. The memory 1510 may store, for use by the UE 1500, any of a variety of various operating systems or combinations of operating systems.

The memory 1510 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1510 may allow the UE 1500 to access instructions, application programs and the like, stored on transitory or non-transitory memory media, to off-load data, or to upload data. An article of manufacture, such as one utilizing a communication system may be tangibly embodied as or in the memory 1510, which may be or comprise a device-readable storage medium.

The processing circuitry 1502 may be configured to communicate with an access network or other network using the communication interface 1512. The communication interface 1512 may comprise one or more communication subsystems and may include or be communicatively coupled to an antenna 1522. The communication interface 1512 may include one or more transceivers used to communicate, such as by communicating with one or more remote transceivers of another device capable of wireless communication (e.g., another UE or a network node in an access network). Each transceiver may include a transmitter 1518 and/or a receiver 1520 appropriate to provide network communications (e.g., optical, electrical, frequency allocations, and so forth). Moreover, the transmitter 1518 and receiver 1520 may be coupled to one or more antennas (e.g., antenna 1522) and may share circuit components, software or firmware, or alternatively be implemented separately.

In some embodiments, communication functions of the communication interface 1512 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1512, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE 1500 shown in FIG. 15.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 16:
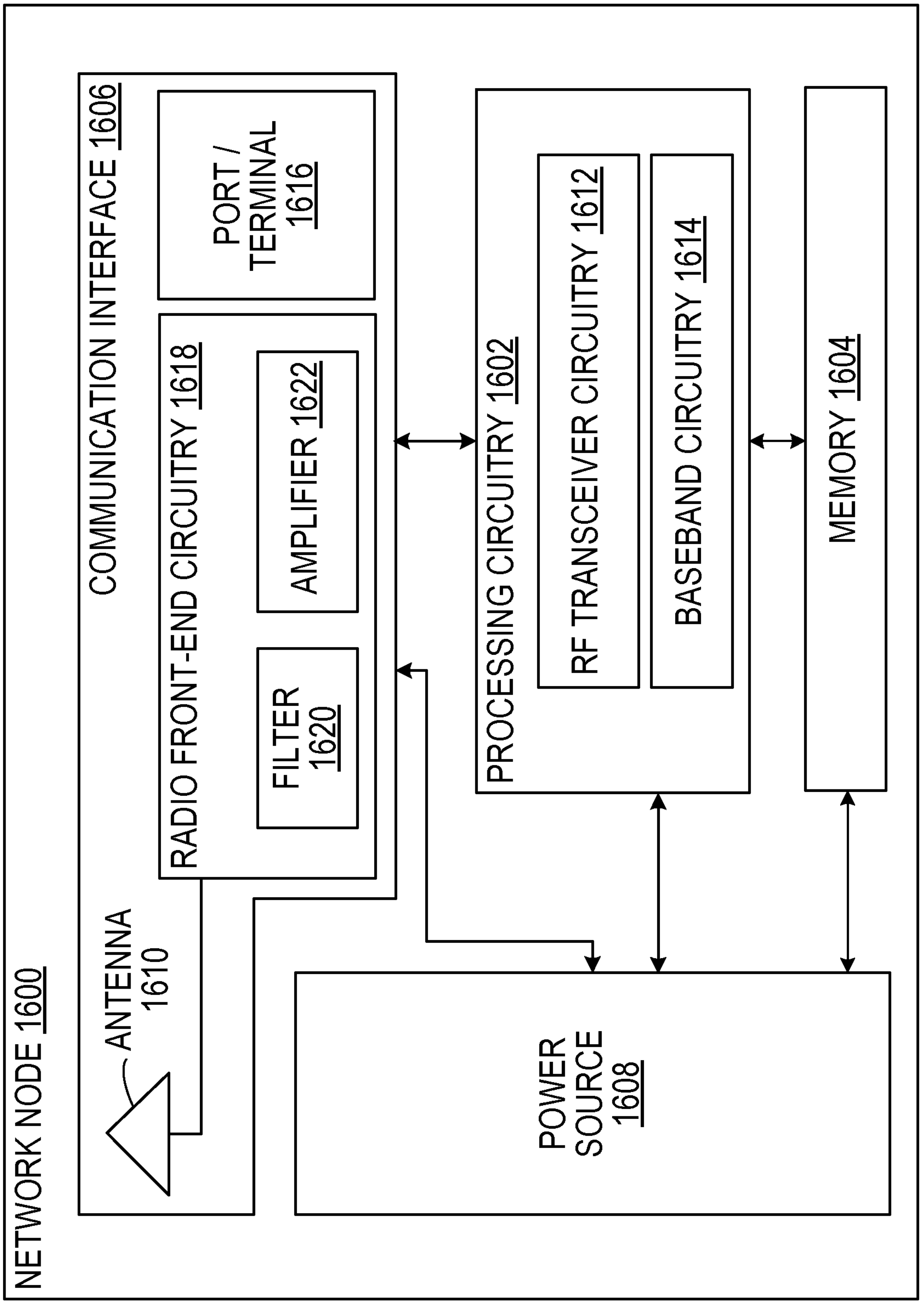
FIG. 16 shows a network node in accordance with some embodiments.

FIG. 16 shows a network node 1600 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1600 includes processing circuitry 1602, a memory 1604, a communication interface 1606, and a power source 1608, and/or any other component, or any combination thereof. The network node 1600 may be composed of multiple physically separate components (e.g., a NodeB component and a RNC component, or a BTS component and a BSC component, etc.), which may each have their own respective components. In certain scenarios in which the network node 1600 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1600 may be configured to support multiple radio access technologies (RATs). In such embodiments, some components may be duplicated (e.g., separate memory 1604 for different RATs) and some components may be reused (e.g., a same antenna 1610 may be shared by different RATs). The network node 1600 may also include multiple sets of the various illustrated components for different wireless technologies integrated into network node 1600, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1600.

The processing circuitry 1602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1600 components, such as the memory 1604, network node 1600 functionality. For example, the processing circuitry 1602 may be configured to cause the network node to perform the methods as described with reference to FIGS. 12 and/or 13. That is, the processing circuitry 1602 may be configured to act as the first network node described above, and perform one or more of the actions described above with respect to FIG. 12. Additionally or alternatively, the processing circuitry 1602 may be configured to act as the second network node described above, and perform one or more of the actions described above with respect to FIG. 13.

In some embodiments, the processing circuitry 1602 includes a system on a chip (SOC). In some embodiments, the processing circuitry 1602 includes one or more of radio frequency (RF) transceiver circuitry 1612 and baseband processing circuitry 1614. In some embodiments, the radio frequency (RF) transceiver circuitry 1612 and the baseband processing circuitry 1614 may be on separate chips (or sets of chips), boards, or units, such as radio units and digital units. In alternative embodiments, part or all of RF transceiver circuitry 1612 and baseband processing circuitry 1614 may be on the same chip or set of chips, boards, or units.

The memory 1604 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1602. The memory 1604 may store any suitable instructions, data, or information, including a computer program, software, an application including one or more of logic, rules, code, tables, and/or other instructions capable of being executed by the processing circuitry 1602 and utilized by the network node 1600. The memory 1604 may be used to store any calculations made by the processing circuitry 1602 and/or any data received via the communication interface 1606. In some embodiments, the processing circuitry 1602 and memory 1604 is integrated.

The communication interface 1606 is used in wired or wireless communication of signaling and/or data between a network node, access network, and/or UE. As illustrated, the communication interface 1606 comprises port(s)/terminal(s) 1616 to send and receive data, for example to and from a network over a wired connection. The communication interface 1606 also includes radio front-end circuitry 1618 that may be coupled to, or in certain embodiments a part of, the antenna 1610. Radio front-end circuitry 1618 comprises filters 1620 and amplifiers 1622. The radio front-end circuitry 1618 may be connected to an antenna 1610 and processing circuitry 1602. The radio front-end circuitry may be configured to condition signals communicated between antenna 1610 and processing circuitry 1602. The radio front-end circuitry 1618 may receive digital data that is to be sent out to other network nodes or UEs via a wireless connection. The radio front-end circuitry 1618 may convert the digital data into a radio signal having the appropriate channel and bandwidth parameters using a combination of filters 1620 and/or amplifiers 1622. The radio signal may then be transmitted via the antenna 1610. Similarly, when receiving data, the antenna 1610 may collect radio signals which are then converted into digital data by the radio front-end circuitry 1618. The digital data may be passed to the processing circuitry 1602. In other embodiments, the communication interface may comprise different components and/or different combinations of components.

In certain alternative embodiments, the network node 1600 does not include separate radio front-end circuitry 1618, instead, the processing circuitry 1602 includes radio front-end circuitry and is connected to the antenna 1610. Similarly, in some embodiments, all or some of the RF transceiver circuitry 1612 is part of the communication interface 1606. In still other embodiments, the communication interface 1606 includes one or more ports or terminals 1616, the radio front-end circuitry 1618, and the RF transceiver circuitry 1612, as part of a radio unit (not shown), and the communication interface 1606 communicates with the baseband processing circuitry 1614, which is part of a digital unit (not shown).

The antenna 1610 may include one or more antennas, or antenna arrays, configured to send and/or receive wireless signals. The antenna 1610 may be coupled to the radio front-end circuitry 1618 and may be any type of antenna capable of transmitting and receiving data and/or signals wirelessly. In certain embodiments, the antenna 1610 is separate from the network node 1600 and connectable to the network node 1600 through an interface or port.

The antenna 1610, communication interface 1606, and/or the processing circuitry 1602 may be configured to perform any receiving operations and/or certain obtaining operations described herein as being performed by the network node. Any information, data and/or signals may be received from a UE, another network node and/or any other network equipment. Similarly, the antenna 1610, the communication interface 1606, and/or the processing circuitry 1602 may be configured to perform any transmitting operations described herein as being performed by the network node. Any information, data and/or signals may be transmitted to a UE, another network node and/or any other network equipment.

The power source 1608 provides power to the various components of network node 1600 in a form suitable for the respective components (e.g., at a voltage and current level needed for each respective component). The power source 1608 may further comprise, or be coupled to, power management circuitry to supply the components of the network node 1600 with power for performing the functionality described herein. For example, the network node 1600 may be connectable to an external power source (e.g., the power grid, an electricity outlet) via an input circuitry or interface such as an electrical cable, whereby the external power source supplies power to power circuitry of the power source 1608. As a further example, the power source 1608 may comprise a source of power in the form of a battery or battery pack which is connected to, or integrated in, power circuitry. The battery may provide backup power should the external power source fail.

Embodiments of the network node 1600 may include additional components beyond those shown in FIG. 16 for providing certain aspects of the network node's functionality, including any of the functionality described herein and/or any functionality necessary to support the subject matter described herein. For example, the network node 1600 may include user interface equipment to allow input of information into the network node 1600 and to allow output of information from the network node 1600. This may allow a user to perform diagnostic, maintenance, repair, and other administrative functions for the network node 1600.

Figure 17:
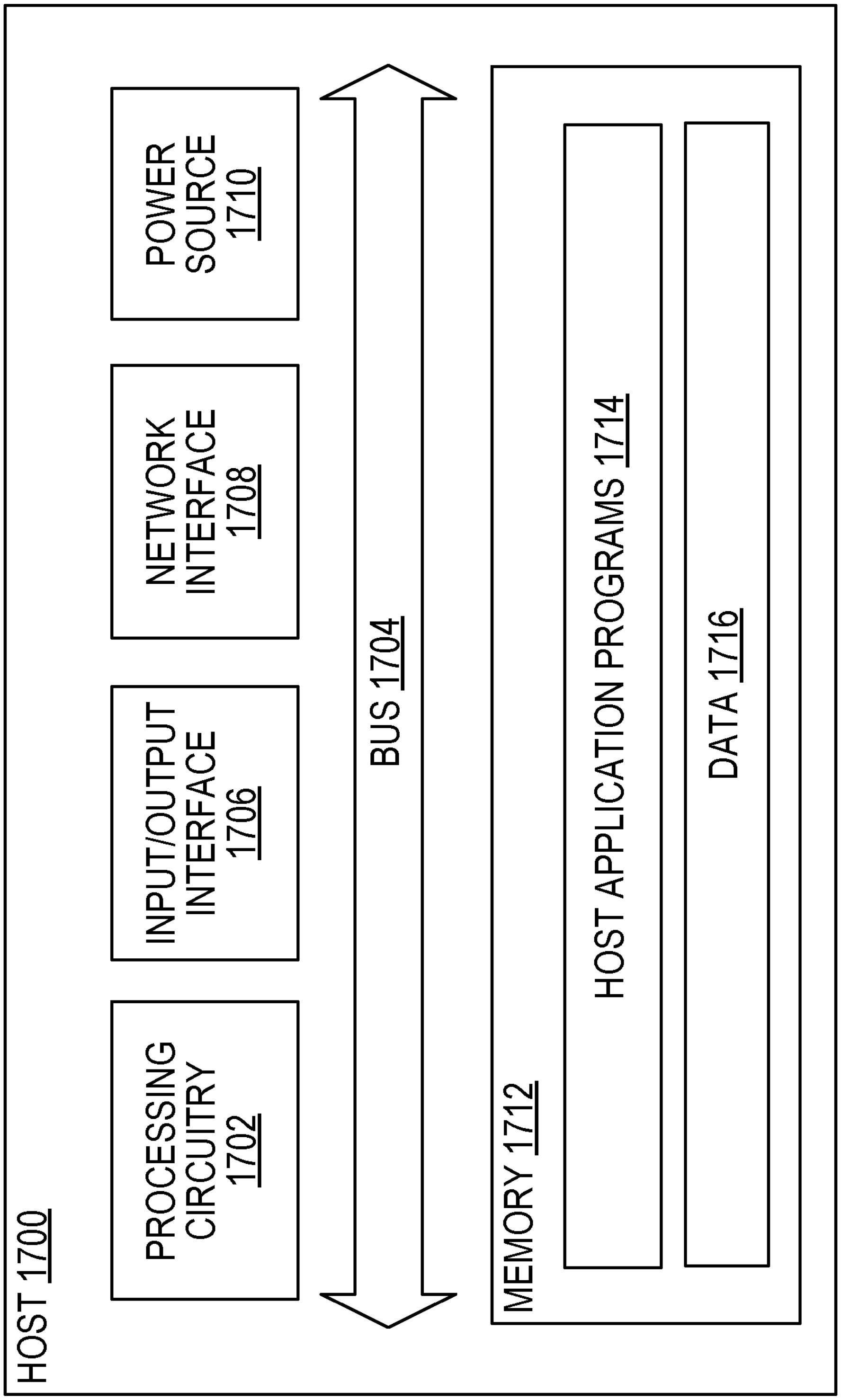
FIG. 17 is a block diagram of a host in accordance with some embodiments.

FIG. 17 is a block diagram of a host 1700, which may be an embodiment of the host 1416 of FIG. 14, in accordance with various aspects described herein. As used herein, the host 1700 may be or comprise various combinations hardware and/or software, including a standalone server, a blade server, a cloud-implemented server, a distributed server, a virtual machine, container, or processing resources in a server farm. The host 1700 may provide one or more services to one or more UEs.

The host 1700 includes processing circuitry 1702 that is operatively coupled via a bus 1704 to an input/output interface 1706, a network interface 1708, a power source 1710, and a memory 1712. Other components may be included in other embodiments. Features of these components may be substantially similar to those described with respect to the devices of previous figures, such as FIGS. 15 and 16, such that the descriptions thereof are generally applicable to the corresponding components of host 1700.

The memory 1712 may include one or more computer programs including one or more host application programs 1714 and data 1716, which may include user data, e.g., data generated by a UE for the host 1700 or data generated by the host 1700 for a UE. Embodiments of the host 1700 may utilize only a subset or all of the components shown. The host application programs 1714 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1714 may also provide for user authentication and licensing checks and may periodically report health, routes, and content availability to a central node, such as a device in or on the edge of a core network. Accordingly, the host 1700 may select and/or indicate a different host for over-the-top services for a UE. The host application programs 1714 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 18:
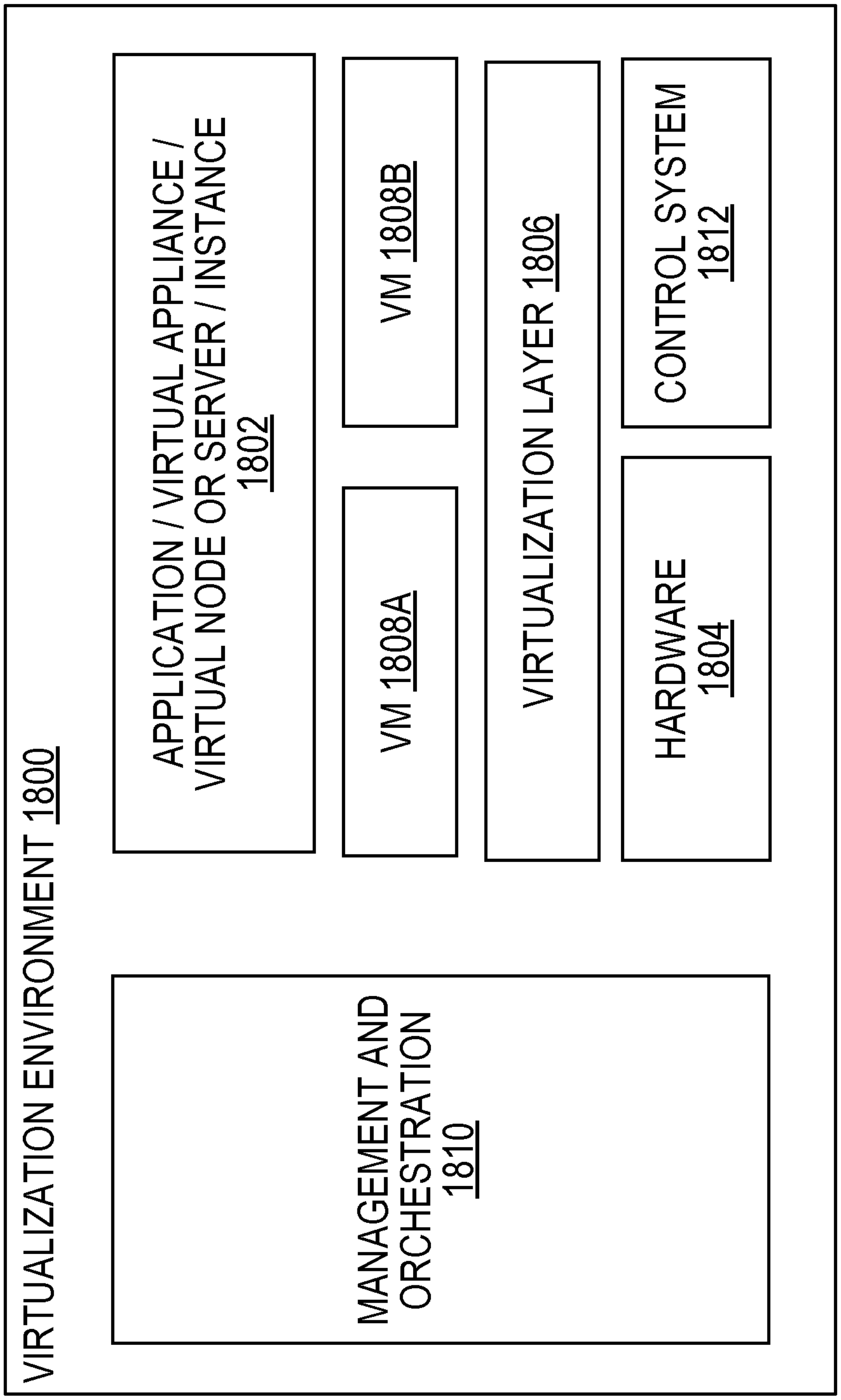
FIG. 18 is a block diagram illustrating a virtualization environment in accordance with some embodiments.

FIG. 18 is a block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1800 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1802 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1804 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1806 (also referred to as hypervisors or virtual machine monitors (VMMs)), provide VMs **1808*a* and 1808*b* (one or more of which may be generally referred to as VMs 1808), and/or perform any of the functions, features and/or benefits described in relation with some embodiments described herein. The virtualization layer 1806 may present a virtual operating platform that appears like networking hardware to the VMs 1808**.

The VMs 1808 comprise virtual processing, virtual memory, virtual networking or interface and virtual storage, and may be run by a corresponding virtualization layer 1806. Different embodiments of the instance of a virtual appliance 1802 may be implemented on one or more of VMs 1808, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1808 may be a software implementation of a physical machine that runs programs as if they were executing on a physical, non-virtualized machine. Each of the VMs 1808, and that part of hardware 1804 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1808 on top of the hardware 1804 and corresponds to the application 1802.

Hardware 1804 may be implemented in a standalone network node with generic or specific components. Hardware 1804 may implement some functions via virtualization. Alternatively, hardware 1804 may be part of a larger cluster of hardware (e.g. such as in a data center or CPE) where many hardware nodes work together and are managed via management and orchestration 1810, which, among others, oversees lifecycle management of applications 1802. In some embodiments, hardware 1804 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1812 which may alternatively be used for communication between hardware nodes and radio units.

Figure 19:
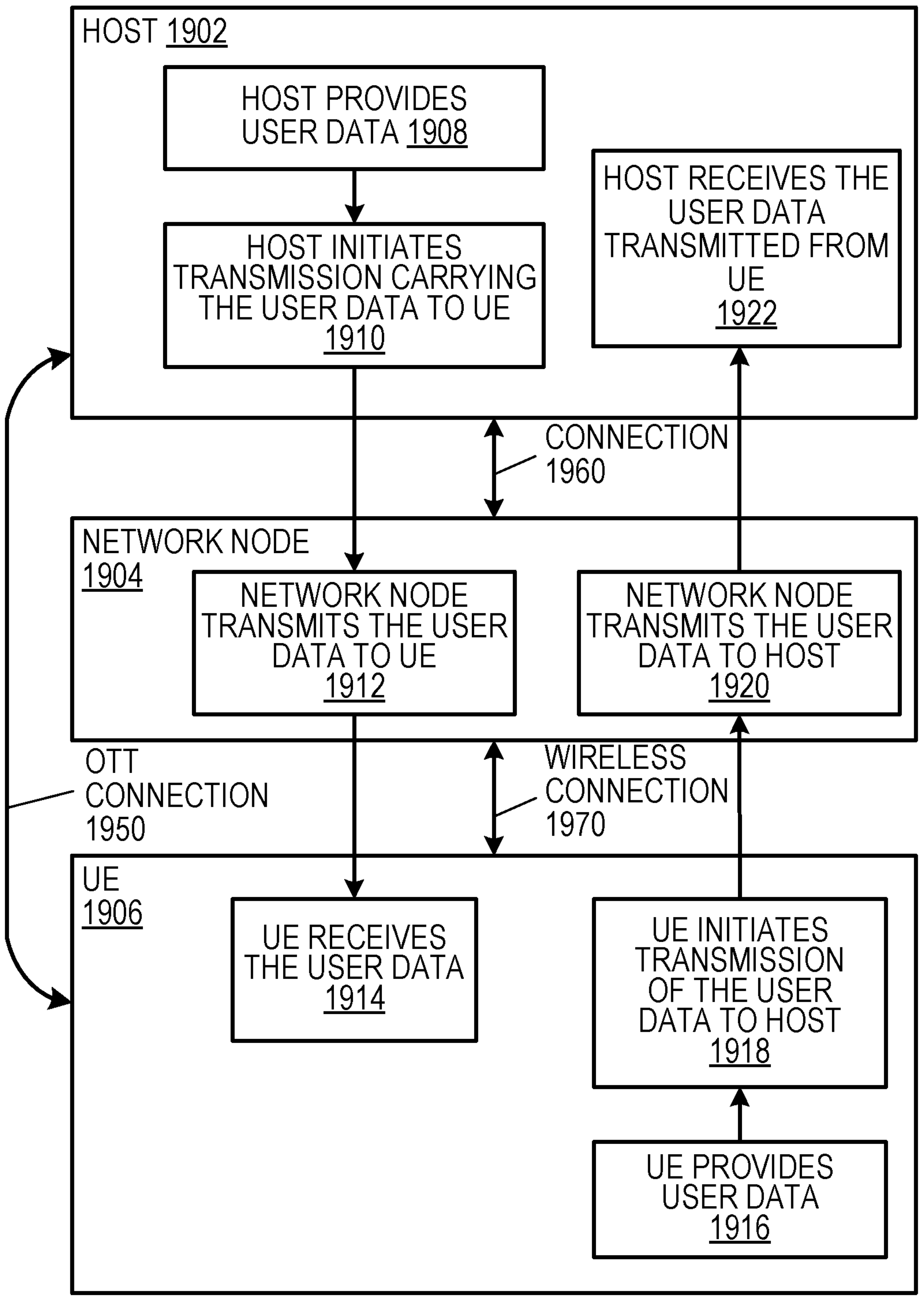
FIG. 19 shows a communication diagram of a host in accordance with some embodiments.

FIG. 19 shows a communication diagram of a host 1902 communicating via a network node 1904 with a UE 1906 over a partially wireless connection in accordance with some embodiments. Example implementations, in accordance with various embodiments, of the UE (such as a UE 1412*a* of FIG. 14 and/or UE 1500 of FIG. 15), network node (such as network node 1410*a* of FIG. 14 and/or network node 1600 of FIG. 16), and host (such as host 1416 of FIG. 14 and/or host 1700 of FIG. 17) discussed in the preceding paragraphs will now be described with reference to FIG. 19.

Like host 1700, embodiments of host 1902 include hardware, such as a communication interface, processing circuitry, and memory. The host 1902 also includes software, which is stored in or accessible by the host 1902 and executable by the processing circuitry. The software includes a host application that may be operable to provide a service to a remote user, such as the UE 1906 connecting via an over-the-top (OTT) connection 1950 extending between the UE 1906 and host 1902. In providing the service to the remote user, a host application may provide user data which is transmitted using the OTT connection 1950.

The network node 1904 includes hardware enabling it to communicate with the host 1902 and UE 1906. The connection 1960 may be direct or pass through a core network (like core network 1406 of FIG. 14) and/or one or more other intermediate networks, such as one or more public, private, or hosted networks. For example, an intermediate network may be a backbone network or the Internet.

The UE 1906 includes hardware and software, which is stored in or accessible by UE 1906 and executable by the UE's processing circuitry. The software includes a client application, such as a web browser or operator-specific "app" that may be operable to provide a service to a human or non-human user via UE 1906 with the support of the host 1902. In the host 1902, an executing host application may communicate with the executing client application via the OTT connection 1950 terminating at the UE 1906 and host 1902. In providing the service to the user, the UE's client application may receive request data from the host's host application and provide user data in response to the request data. The OTT connection 1950 may transfer both the request data and the user data. The UE's client application may interact with the user to generate the user data that it provides to the host application through the OTT connection 1950.

The OTT connection 1950 may extend via a connection 1960 between the host 1902 and the network node 1904 and via a wireless connection 1970 between the network node 1904 and the UE 1906 to provide the connection between the host 1902 and the UE 1906. The connection 1960 and wireless connection 1970, over which the OTT connection 1950 may be provided, have been drawn abstractly to illustrate the communication between the host 1902 and the UE 1906 via the network node 1904, without explicit reference to any intermediary devices and the precise routing of messages via these devices.

As an example of transmitting data via the OTT connection 1950, in step 1908, the host 1902 provides user data, which may be performed by executing a host application. In some embodiments, the user data is associated with a particular human user interacting with the UE 1906. In other embodiments, the user data is associated with a UE 1906 that shares data with the host 1902 without explicit human interaction. In step 1910, the host 1902 initiates a transmission carrying the user data towards the UE 1906. The host 1902 may initiate the transmission responsive to a request transmitted by the UE 1906. The request may be caused by human interaction with the UE 1906 or by operation of the client application executing on the UE 1906. The transmission may pass via the network node 1904, in accordance with the teachings of the embodiments described throughout this disclosure. Accordingly, in step 1912, the network node 1904 transmits to the UE 1906 the user data that was carried in the transmission that the host 1902 initiated, in accordance with the teachings of the embodiments described throughout this disclosure. In step 1914, the UE 1906 receives the user data carried in the transmission, which may be performed by a client application executed on the UE 1906 associated with the host application executed by the host 1902.

In some examples, the UE 1906 executes a client application which provides user data to the host 1902. The user data may be provided in reaction or response to the data received from the host 1902. Accordingly, in step 1916, the UE 1906 may provide user data, which may be performed by executing the client application. In providing the user data, the client application may further consider user input received from the user via an input/output interface of the UE 1906. Regardless of the specific manner in which the user data was provided, the UE 1906 initiates, in step 1918, transmission of the user data towards the host 1902 via the network node 1904. In step 1920, in accordance with the teachings of the embodiments described throughout this disclosure, the network node 1904 receives user data from the UE 1906 and initiates transmission of the received user data towards the host 1902. In step 1922, the host 1902 receives the user data carried in the transmission initiated by the UE 1906.

One or more of the various embodiments improve the performance of OTT services provided to the UE 1906 using the OTT connection 1950, in which the wireless connection 1970 forms the last segment. More precisely, the teachings of these embodiments may improve the latency and reliability of uplink transmissions and thereby provide benefits such as better responsiveness.

In an example scenario, factory status information may be collected and analyzed by the host 1902. As another example, the host 1902 may process audio and video data which may have been retrieved from a UE for use in creating maps. As another example, the host 1902 may collect and analyze real-time data to assist in controlling vehicle congestion (e.g., controlling traffic lights). As another example, the host 1902 may store surveillance video uploaded by a UE. As another example, the host 1902 may store or control access to media content such as video, audio, VR or AR which it can broadcast, multicast or unicast to UEs. As other examples, the host 1902 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1950 between the host 1902 and UE 1906, in response to variations in the measurement results. The measurement procedure and/or the network functionality for reconfiguring the OTT connection may be implemented in software and hardware of the host 1902 and/or UE 1906. In some embodiments, sensors (not shown) may be deployed in or in association with other devices through which the OTT connection 1950 passes; the sensors may participate in the measurement procedure by supplying values of the monitored quantities exemplified above, or supplying values of other physical quantities from which software may compute or estimate the monitored quantities. The reconfiguring of the OTT connection 1950 may include message format, retransmission settings, preferred routing etc.; the reconfiguring need not directly alter the operation of the network node 1904. Such procedures and functionalities may be known and practiced in the art. In certain embodiments, measurements may involve proprietary UE signaling that facilitates measurements of throughput, propagation times, latency and the like, by the host 1902. The measurements may be implemented in that software causes messages to be transmitted, in particular empty or 'dummy' messages, using the OTT connection 1950 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The following numbered statements set out embodiments of the disclosure:

Group B Embodiments

1. A method performed by a first network node for uplink congestion control in a radio network, the first network node handling one or more first layers of a protocol stack for an uplink connection between a wireless device and the radio network, the first network node being communicatively coupled to a second network node handling one or more second layers of the protocol stack for the uplink connection, wherein the one or more second layers are lower than the one or more first layers, the method comprising:
   - obtaining an indication of a proportion of packets within an uplink user plane flow over the uplink connection that are to be marked with a congestion indicator, wherein the proportion is based on a delay experienced by packets of the uplink user plane flow sent to the second network node;
   - marking the proportion of packets with the congestion indicator; and
   - transmitting packets for the uplink user plane flow towards a core network of the radio network.

2. The method of embodiment 1, wherein the proportion of packets are marked in a packet data convergence protocol, PDCP, entity of the first network node.

3. The method of embodiment 1 or 2, wherein the indication of the proportion of packets that are to be marked comprises an indication of a probability, and wherein marking the proportion of packets with the congestion indicator comprises marking packets of the uplink user plane flow with the congestion indicator in accordance with the probability.

4. The method of any one of the preceding embodiments, wherein obtaining the indication of the proportion of packets that are to be marked comprises receiving the indication of the proportion of packets that are to be marked from the second network node.

5. The method of embodiment 4, wherein the indication of the proportion of packets that are to be marked is received in an assistance information protocol data unit, PDU, transmitted by the second network node.

6. The method of embodiment 4, wherein the indication of the proportion of packets that are to be marked is received in a downlink data delivery status PDU transmitted by the second network node.

7. The method of any one of embodiment 1 to 3, wherein obtaining the indication of the proportion of packets that are to be marked comprises calculating the proportion of packets based on the delay experienced by packets of the uplink user plane flow sent to the second network node.

8. The method of embodiment 7, further comprising receiving, from the second network node, an indication of the delay experienced by packets of the uplink user plane flow sent to the second network node.

9. The method of embodiment 8, wherein the delay experienced by packets of the uplink user plane flow comprises the delay between transmission of a buffer status report by the wireless device to the second network node, and transmission of data corresponding to the buffer status report by the second network node to the first network node.

10. The method of embodiment 8 or 9, wherein the delay experienced by packets of the uplink user plane flow comprises the delay between transmission of a buffer status report by the wireless device to the second network node, and transmission of all data indicated in the buffer status report by the second network node to the first network node.

11. The method of any one of embodiments 8 to 10, wherein the indication of the delay experienced by packets of the uplink user plane flow sent to the second network node is piggybacked within data for the uplink user plane flow.

12. The method of any one of embodiments 8 to 10, wherein the indication of the delay experienced by packets of the uplink user plane flow sent to the second network node is received in an assistance information PDU from the second network node.

13. The method of any one of embodiments 8 to 12, wherein the indication of the delay experienced by packets of the uplink user plane flow sent to the second network node comprises an indication of an average delay experienced by packets of the uplink user plane flow sent to the second network node.

14. The method of embodiment 7, further comprising calculating or estimating the delay experienced by packets of the uplink user plane flow sent to the second network node.

15. The method of embodiment 14, wherein the delay experienced by packets of the uplink user plane flow sent to the second network node is estimated or calculated based on information received from the second network node.

16. The method of embodiment 15, wherein the information received from the second network node comprises one or more of: uplink data flow; uplink delay over a radio interface; one or more radio quality metrics for a connection between the wireless device and the second network node; an indication of a status of one or more uplink channels between the wireless device and the second network node; an indication of a round-trip time for transmissions between the first network node and the second network node.

17. The method of any one of embodiments 14 to 16, wherein the delay experienced by packets of the uplink user plane flow sent to the second network node is estimated or calculated based on information received from a third network node, e.g., a control plane node such as a control plane centralized unit, concerning resources utilized in a cell served by the second network node.

18. The method of embodiment 17, wherein the information received from the third network node comprises one or more of: an indication of a utilization of physical resource blocks; an indication of the availability of resources in the cell; a number of active wireless devices in the cell; a number of RRC connections in the cell; and one or more transport level traffic load indications.

19. The method of embodiment 1 or 2, further comprising receiving data packets for the uplink user plane flow from the second network node, wherein obtaining an indication of the proportion of packets that are to be marked with a congestion indicator comprises a subset of the data packets received from the second network node that are marked with a first congestion indicator, and wherein marking packets for the uplink user plane flow with a congestion indicator comprises marking internet protocol packets within the subset of data packets received from the second network node with a second congestion indicator.

20. A method performed by a second network node for uplink congestion control in a radio network, the second network node handling one or more second layers of a protocol stack for an uplink connection between a wireless device and the radio network, the second network node being communicatively coupled to a first network node handling one or more first layers of the protocol stack for the uplink connection, wherein the one or more second layers are lower than the one or more first layers, the method comprising:

sending, to the first network node, packets for an uplink user plane flow over the uplink connection, for onward transmission towards a core network node the radio network; and sending, to the first network node, one or more of:

an indication of a proportion of packets within the uplink user plane flow over the uplink connection that are to be marked with a congestion indicator, wherein the proportion is based on a delay experienced by packets of the uplink user plane flow sent by the wireless device to the second network node;

an indication of the delay experienced by packets of the uplink user plane flow sent by the wireless device to the second network node; and information enabling the first network node to calculate or estimate the delay experienced by packets of the uplink user plane flow sent by the wireless device to the second network node.

21. The method of embodiment 20, wherein the indication of the proportion of packets that are to be marked with a congestion indicator comprises a subset of the data packets sent to the first network node that are marked with a first congestion indicator, enabling the first network node to mark internet protocol packets within the subset of data packets with a second congestion indicator.

22. The method of embodiment 20, wherein the method comprises sending, to the first network node, information enabling the first network node to calculate or estimate the delay experienced by packets of the uplink user plane flow sent by the wireless device to the second network node, and wherein the information comprises one or more of: uplink data flow; uplink delay over a radio interface; one or more radio quality metrics for a connection between the wireless device and the second network node; an indication of a status of one or more uplink channels between the wireless device and the second network node; an indication of a round-trip time for transmissions between the first network node and the second network node.

23. The method of embodiment 20, wherein the method comprises sending, to the first network node, an indication of a proportion of packets within the uplink user plane flow over the uplink connection that are to be marked with a congestion indicator, and wherein the indication of the proportion of packets that are to be marked comprises an indication of a probability with which the first network node is to mark packets of the uplink user plane flow with the congestion indicator.

24. The method of embodiment 20, wherein the method comprises sending, to the first network node, an indication of the delay experienced by packets of the uplink user plane flow sent by the wireless device to the second network node, and wherein the delay experienced by packets of the uplink user plane flow comprises the delay between transmission of a buffer status report by the wireless device to the second network node, and transmission of data corresponding to the buffer status report by the second network node to the first network node.

25. The method of embodiment 24, wherein the delay experienced by packets of the uplink user plane flow comprises the delay between transmission of a buffer status report by the wireless device to the second network node, and transmission of all data indicated in the buffer status report by the second network node to the first network node.

26. The method of embodiments 24 or 25, wherein the indication of the delay experienced by packets of the uplink user plane flow sent to the second network node is piggy-backed within data for the uplink user plane flow.

27. The method of any one of embodiments 24 to 26, wherein the indication of the delay experienced by packets of the uplink user plane flow sent to the second network node is received in an assistance information PDU from the second network node.

28. The method of any one of embodiments 24 to 27, wherein the indication of the delay experienced by packets of the uplink user plane flow sent to the second network node comprises an indication of an average delay experienced by packets of the uplink user plane flow sent to the second network node.

29. The method of any one of the preceding embodiments, wherein the one or more first layers comprise a packet data convergence protocol, PDCP, layer.

30. The method of any one of the preceding embodiments, wherein the one or more second layers comprise one or more of: a radio link control, RLC, layer; a medium access control, MAC, layer; and a physical, PHY, layer.

31. The method of any one of the preceding embodiments, wherein the first network node comprises a first, e.g., centralized, unit of a base station and the second network node comprises a second, e.g., distributed, unit of the base station.

32. The method of any one of the preceding embodiments, wherein the congestion indicator comprises a low latency, low loss, scalable throughput, LAS, congestion indicator.

33. The method of any of the previous embodiments, further comprising:

obtaining user data; and forwarding the user data to a host.

Group C Embodiments

34. A network node for uplink congestion control in a radio network, the network node comprising:

processing circuitry configured to cause the network node to perform any of the steps of any of the Group B embodiments;

power supply circuitry configured to supply power to the processing circuitry.

35. A first network node for uplink congestion control in a radio network, the first network node comprising:

processing circuitry configured to cause the first network node to perform the method of any of embodiments 1 to 19 and 29 to 33 (as dependent on embodiments 1 to 19);

power supply circuitry configured to supply power to the processing circuitry.

36. A second network node for uplink congestion control in a radio network, the second network node comprising:

processing circuitry configured to cause the second network node to perform the method of any of embodiments 20 to 28, and 29 to 33 (as dependent on embodiments 20 to 28);

power supply circuitry configured to supply power to the processing circuitry.

37. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

38. The host of the previous embodiment, wherein:

the processing circuitry of the host is configured to execute a host application that provides the user data; and the UE comprises processing circuitry configured to execute a client application associated with the host application to receive the transmission of user data from the host.

39. A method implemented in a host configured to operate in a communication system that further includes a network node and a user equipment (UE), the method comprising:

providing user data for the UE; and initiating a transmission carrying the user data to the UE via a cellular network comprising the network node, wherein the network node performs any of the operations of any of the Group B embodiments to transmit the user data from the host to the UE.

40. The method of the previous embodiment, further comprising, at the network node, transmitting the user data provided by the host for the UE.

41. The method of any of the previous 2 embodiments, wherein the user data is provided at the host by executing a host application that interacts with a client application executing on the UE, the client application being associated with the host application.

42. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

43. The communication system of the previous embodiment, further comprising:

the network node; and/or the user equipment.

44. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

45. The host of the previous embodiment, wherein:

the processing circuitry of the host is configured to execute a host application, thereby providing the user data; and the host application is configured to interact with a client application executing on the UE, the client application being associated with the host application.

46. The host of the any of the previous 2 embodiments, wherein the initiating receipt of the user data comprises requesting the user data.

47. A method implemented by a host configured to operate in a communication system that further includes a network node and a user equipment (UE), the method comprising:

at the host, initiating receipt of user data from the UE, the user data originating from a transmission which the network node has received from the UE, wherein the network node performs any of the steps of any of the Group B embodiments to receive the user data from the UE for the host.

48. The method of the previous embodiment, further comprising at the network node, transmitting the received user data to the host.

Abbreviations

At least some of the following abbreviations may be used in this disclosure. If there is an inconsistency between abbreviations, preference should be given to how it is used above. If listed multiple times below, the first listing should be preferred over any subsequent listing(s).

5GC 5G Core Network
AQM Active Queue Management
AR Augmented Reality
BSR Buffer Status Report
CDA Congestion Detection Algorithm
CE Congestion Experienced
CN Core Network
CQI Channel Quality Indicator
CU Central Unit
DDDS Downlink Data Delivery Status
DL Downlink
DRB Data Radio Bearer
DU Distributed Unit
E1AP E1 Application Protocol
E2E End-to-end
ECN Explicit Congestion Notification
GTP GPRS Tunnelling Protocol
HARQ Hybrid Automatic Repeat Request
L4S Low Latency, Low Loss, Scalable throughput
MAC Medium Access Control
MBB Mobile Broadband
NG Next Generation
PDCP Packet Data Convergence Protocol
PDU Protocol Data Unit
PHY Physical Layer
QoE Quality of Experience
QOS Quality of Service
RAN Radio Access Network
RLC Radio Link Control
RTT Round-trip-time
SDAP Service Data Adaption Protocol
UE User Equipment
UL Uplink
UP User Plane
URLLC Ultra-reliable Low Latency Communication
VR Virtual Reality
1×RTT CDMA2000 1× Radio Transmission Technology
3GPP 3rd Generation Partnership Project
5G 5th Generation
6G 6th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
eMBMS evolved Multimedia Broadcast Multicast Services
E-SMLC Evolved-Serving Mobile Location Centre
ECGI Evolved CGI
eNB E-UTRAN NodeB
ePDCCH Enhanced Physical Downlink Control Channel
E-SMLC Evolved Serving Mobile Location Center
E-UTRA Evolved UTRA E-UTRAN Evolved UTRAN
FDD Frequency Division Duplex
FFS For Further Study
gNB Base station in NR
GNSS Global Navigation Satellite System
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MAC Message Authentication Code
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
USIM Universal Subscriber Identity Module
UTDOA Uplink Time Difference of Arrival
WCDMA Wide CDMA
WLAN Wide Local Area Network

The invention claimed is:

1. A method performed by a first network node for uplink congestion control in a radio network, the first network node handling one or more first layers of a protocol stack, including a packet data convergence protocol (PDCP) layer, for an uplink connection between a wireless device and the radio network, the first network node being communicatively coupled to a second network node handling one or more second layers of the protocol stack for the uplink connection, wherein the one or more second layers are lower than the one or more first layers, the method comprising:

receiving from the second network node an assistance information protocol data unit (PDU) comprising an indication of a proportion of packets within an uplink user plane flow over the uplink connection that are to be marked with a congestion indicator, wherein the proportion is based on a delay experienced by packets of the uplink user plane flow sent by the wireless device to the second network node;

marking the proportion of packets with the congestion indicator; and transmitting packets for the uplink user plane flow towards a core network of the radio network.

2. The method of claim 1, wherein the marking the proportion of packets with the congestion indicator is performed by setting Explicit Congestion Notification (ECN) bits in the IP header of the packets.

3. The method of claim 1, wherein the indication explicitly states the proportion of packets that are to be marked.

4. A method performed by a second network node for uplink congestion control in a radio network, the second network node handling one or more second layers of a protocol stack for an uplink connection between a wireless device and the radio network, the second network node being communicatively coupled to a first network node handling one or more first layers of the protocol stack for the uplink connection, including a packet data convergence protocol (PDCP) layer, wherein the one or more second layers are lower than the one or more first layers, the method comprising:

sending, to the first network node, packets for an uplink user plane flow over the uplink connection, for onward transmission towards a core network node the radio network; and sending, to the first network node an assistance information protocol data unit (PDU) comprising an indication of a proportion of packets within the uplink user plane flow over the uplink connection that are to be marked with a congestion indicator, wherein the proportion is based on a delay experienced by packets of the uplink user plane flow sent by the wireless device to the second network node.

5. The method of claim 4, wherein the indication explicitly states the proportion of packets that are to be marked.

6. The method of claim 4, wherein the indication of the proportion of packets that are to be marked comprises an indication of a probability with which the first network node is to mark packets of the uplink user plane flow with the congestion indicator.

7. The method of claim 4, wherein the first network node comprises a centralized unit of a base station and the second network node comprises a distributed unit of the base station.

8. A first network node for uplink congestion control in a radio network, the first network node handling one or more first layers of a protocol stack, including a packet data convergence protocol (PDCP) layer, for an uplink connection between a wireless device and the radio network, the first network node being communicatively coupled to a second network node handling one or more second layers of the protocol stack for the uplink connection, wherein the one or more second layers are lower than the one or more first layers, the first network node comprising:

processing circuitry configured to cause the first network node to:

receive from the second network node an assistance information protocol data unit (PDU) comprising an indication of a proportion of packets within an uplink user plane flow over the uplink connection that are to be marked with a congestion indicator, wherein the proportion is based on a delay experienced by packets of the uplink user plane flow sent by the wireless device to the second network node;

mark the proportion of packets with the congestion indicator; and transmit packets for the uplink user plane flow towards a core network of the radio network.

9. The first network node of claim 8, wherein the mark with the congestion indicator, in the proportion of packets, is by Explicit Congestion Notification (ECN) bits in the IP header of the packets.

10. The first network node of claim 8, wherein the indication explicitly states the proportion of packets that are to be marked.

11. A second network node for uplink congestion control in a radio network, the second network node handling one or more second layers of a protocol stack for an uplink connection between a wireless device and the radio network, the second network node being communicatively coupled to a first network node handling one or more first layers of the protocol stack for the uplink connection, including a packet data convergence protocol (PDCP) layer, wherein the one or more second layers are lower than the one or more first layers, the second network node comprising:

processing circuitry configured to cause the second network node to:

send, to the first network node, packets for an uplink user plane flow over the uplink connection, for onward transmission towards a core network node the radio network; and send, to the first network node, an assistance information protocol data unit (PDU) comprising an indication of a proportion of packets within the uplink user plane flow over the uplink connection that are to be marked with a congestion indicator, wherein the proportion is based on a delay experienced by packets of the uplink user plane flow sent by the wireless device to the second network node.

12. The second network node of claim 11, wherein the indication explicitly states the proportion of packets that are to be marked with a congestion indicator.

13. The second network node of claim 11, wherein the indication of the proportion of packets that are to be marked comprises an indication of a probability with which the first network node is to mark packets of the uplink user plane flow with the congestion indicator.

* * * * *